(12) United States Patent
Buchman et al.

(10) Patent No.: US 12,718,161 B2
(45) Date of Patent: Aug. 25, 2026

(54) MULTI-CLOUD BUDGET CONTROL SYSTEM

(71) Applicant: Dell Products L.P., Round Rock, TX (US)

(72) Inventors: Ophir Buchman, Raanana (IL); Junneng Nie, Shanghai (CN); Jintai Han, Shanghai (CN); Yuehua Liu, Shanghai (CN); Kaixing Si, Shanghai (CN); Susheelkumar Jain, Bangalore (IN); Avinash Pandit, Lucknow (IN)

(73) Assignee: DELL PRODUCTS L.P., Round Rock, TX (US)

( * ) Notice: Subject to any disclaimer, the term of this patent is extended or adjusted under 35 U.S.C. 154(b) by 126 days.

(21) Appl. No.: 18/611,915

(22) Filed: Mar. 21, 2024

(65) Prior Publication Data

US 2025/0299128 A1 Sep. 25, 2025

(51) Int. Cl.
*G06Q 10/06* (2023.01)
*G06Q 10/0631* (2023.01)
*G06Q 10/0637* (2023.01)

(52) U.S. Cl.
CPC . *G06Q 10/06315* (2013.01); *G06Q 10/06375* (2013.01)

(58) Field of Classification Search
CPC ..................................................... G06Q 10/06
See application file for complete search history.

(56) References Cited

U.S. PATENT DOCUMENTS

2015/0222723 A1* 8/2015 Adapalli .............. G06Q 10/067 705/26.41
2018/0300661 A1* 10/2018 Zimmerer .............. G06Q 20/14
2018/0374110 A1* 12/2018 Burli .................. G06Q 10/0631
2021/0044542 A1* 2/2021 Goyal .................. H04L 47/726
2021/0064431 A1* 3/2021 Smith .................. G06F 9/5077
2021/0073034 A1* 3/2021 Bliesner .............. G06F 9/45558
2024/0289712 A1* 8/2024 Krishnaiah ...... G06Q 10/06375
2025/0005498 A1* 1/2025 Crooks .................. G06Q 40/12

* cited by examiner

*Primary Examiner* — Nga B Nguyen
(74) *Attorney, Agent, or Firm* — Amin, Turocy & Watson, LLP

(57) ABSTRACT

Operation of various data servers included in a cloud data server are monitored and controlled to prevent a client from exceeding their available budget for hosting their workloads at the cloud server. Business rules and associated actions can be configured regarding operational cost/usage of hosting client workloads versus an available budget. As a cost approaches or exceeds a defined budget, respective operations and number of available data servers can be auto-scaled/throttled to prevent the client from exceeding the budget while attempting to maintain operation of as many workloads as possible. An operational budget, and also operational spend, throughout a given budget cycle can be predicted. A current cost/usage can be compared with the predicted budget/usage and a current operation of the cloud server can adjusted based on similarity/dissimilarity between the current cost/usage and the predicted budget/usage.

20 Claims, 12 Drawing Sheets

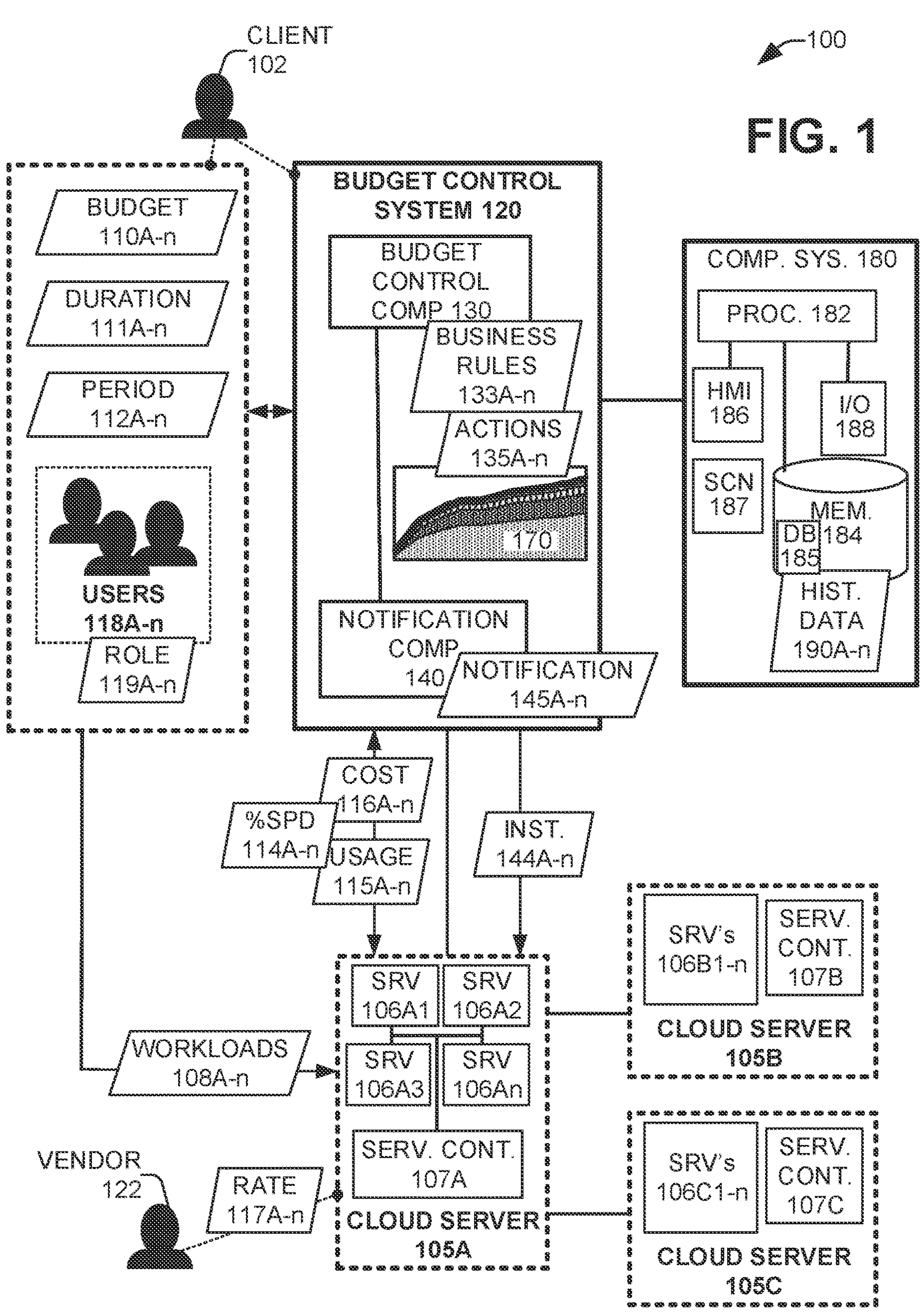
CLIENT
102
100
FIG. 1
BUDGET
110A-n
DURATION
111A-n
PERIOD
112A-n
USERS
118A-n
ROLE
119A-n
BUDGET CONTROL
SYSTEM 120
BUDGET
CONTROL
COMP 130
BUSINESS
RULES
133A-n
ACTIONS
135A-n
170
NOTIFICATION
COMP
140
NOTIFICATION
145A-n
COMP. SYS. 180
PROC. 182
HMI
186
I/O
188
SCN
187
MEM.
184
DB
185
HIST.
DATA
190A-n
COST
116A-n
%SPD
114A-n
USAGE
115A-n
INST.
144A-n
SRV
106A1
SRV
106A2
SRV
106A3
SRV
106An
SERV. CONT.
107A
CLOUD SERVER
105A
WORKLOADS
108A-n
VENDOR
122
RATE
117A-n
SRV's
106B1-n
SERV.
CONT.
107B
CLOUD SERVER
105B
SRV's
106C1-n
SERV.
CONT.
107C
CLOUD SERVER
105C 200A
170
171
BUDGET 110A
$1200
$1000
$800
$600
$400
$200
$0.00
ZONE 210E
T211T (420)
T211E
T211D
ZONE 210D
ZONE 210F
ZONE 210C
T211C
ZONE 210B
T211B
112F
112K
ZONE 210A
T211A
1
5
10
15
20
25
30
PERIOD 112A-n IN PRIOR DURATION(S) 111P-n 200B
170
ZONE 210F
171
ZONE 210E
%SPEND 114
ZONE 210D
ZONE 210C
ZONE 210B
ZONE 210A
BUDGET 110A
DAY

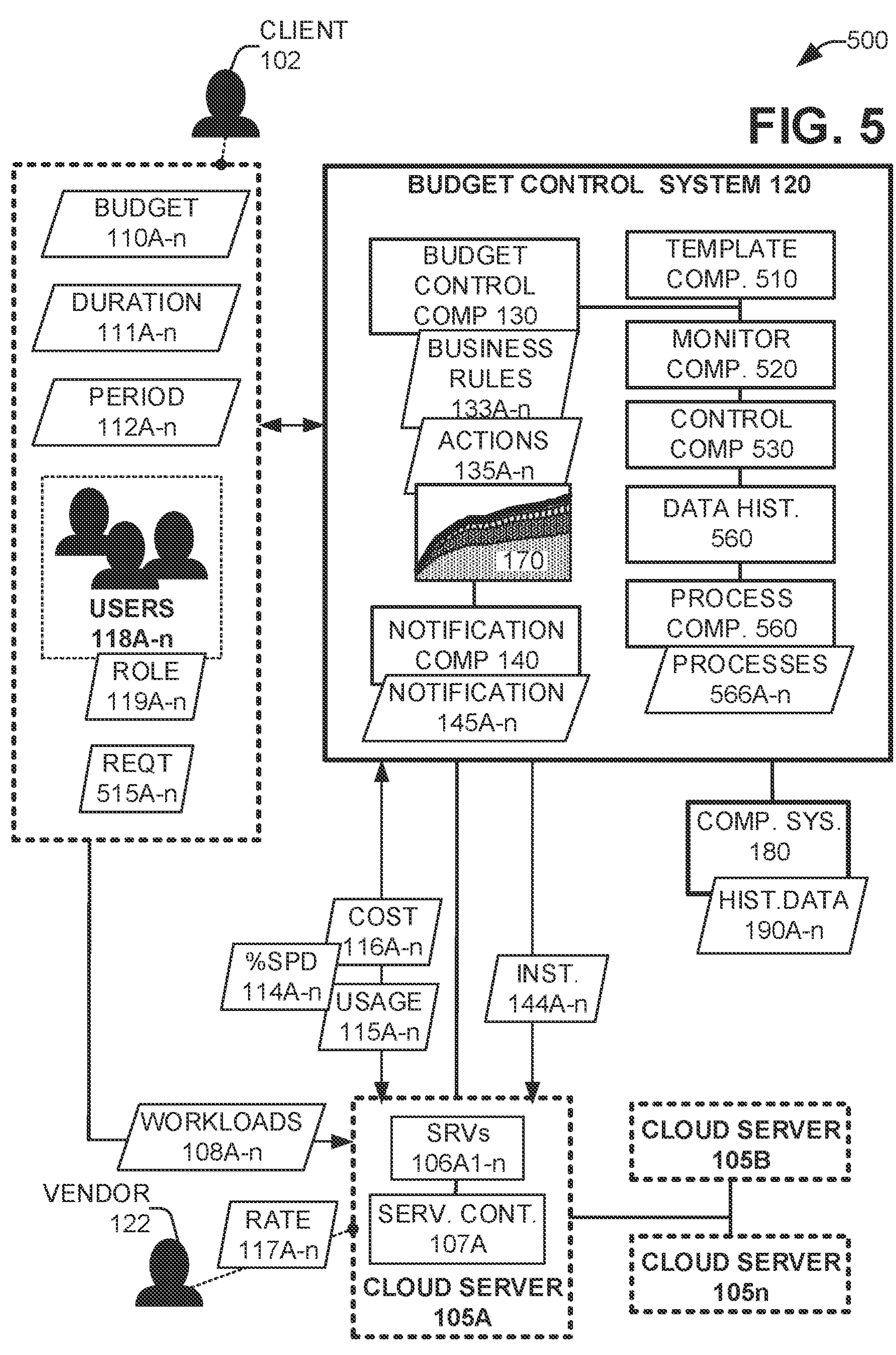

CLIENT 102
500
FIG. 5
BUDGET 110A-n
DURATION 111A-n
PERIOD 112A-n
USERS 118A-n
ROLE 119A-n
REQT 515A-n
BUDGET CONTROL SYSTEM 120
BUDGET CONTROL COMP 130
BUSINESS RULES 133A-n
ACTIONS 135A-n
170
NOTIFICATION COMP 140
NOTIFICATION 145A-n
TEMPLATE COMP. 510
MONITOR COMP. 520
CONTROL COMP 530
DATA HIST. 560
PROCESS COMP. 560
PROCESSES 566A-n
COMP. SYS. 180
HIST.DATA 190A-n
COST 116A-n
%SPD 114A-n
USAGE 115A-n
INST. 144A-n
WORKLOADS 108A-n
VENDOR 122
RATE 117A-n
SRVs 106A1-n
SERV. CONT. 107A
CLOUD SERVER 105A
CLOUD SERVER 105B
CLOUD SERVER 105n

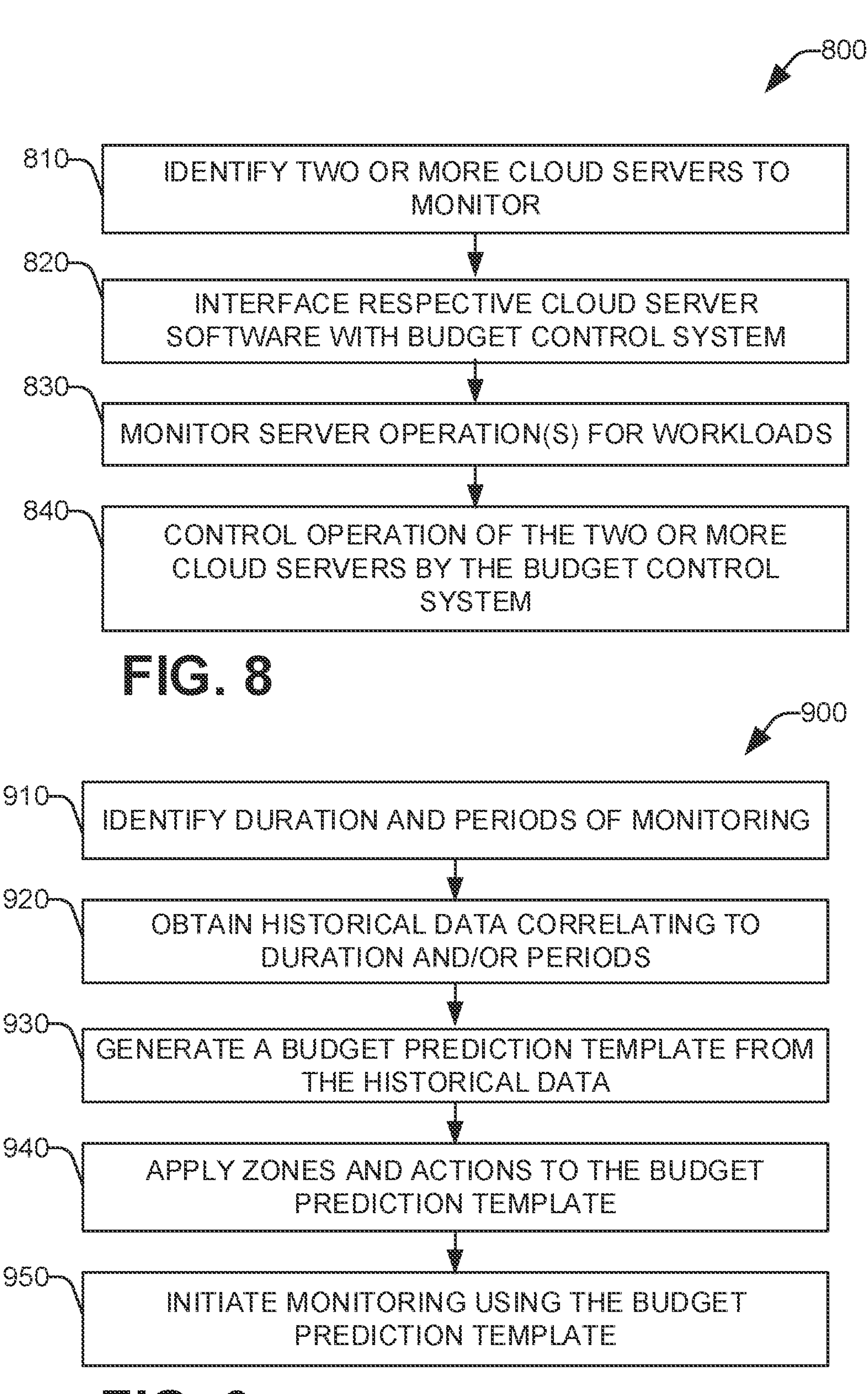
800
810
IDENTIFY TWO OR MORE CLOUD SERVERS TO MONITOR
820
INTERFACE RESPECTIVE CLOUD SERVER SOFTWARE WITH BUDGET CONTROL SYSTEM
830
MONITOR SERVER OPERATION(S) FOR WORKLOADS
840
CONTROL OPERATION OF THE TWO OR MORE CLOUD SERVERS BY THE BUDGET CONTROL SYSTEM
FIG. 8
900
910
IDENTIFY DURATION AND PERIODS OF MONITORING
920
OBTAIN HISTORICAL DATA CORRELATING TO DURATION AND/OR PERIODS
930
GENERATE A BUDGET PREDICTION TEMPLATE FROM THE HISTORICAL DATA
940
APPLY ZONES AND ACTIONS TO THE BUDGET PREDICTION TEMPLATE
950
INITIATE MONITORING USING THE BUDGET PREDICTION TEMPLATE
FIG. 9

MULTI-CLOUD BUDGET CONTROL SYSTEM

BACKGROUND

Workloads can be assigned to, and executed at, data servers, and usage of a data server is often regulated in accordance with a client's operational budget.

SUMMARY

The following presents a summary to provide a basic understanding of one or more embodiments described herein. This summary is not intended to identify key or critical elements, or delineate any scope of the different embodiments and/or any scope of the claims. The sole purpose of the Summary is to present some concepts in a simplified form as a prelude to the more detailed description presented herein.

In one or more embodiments described herein, systems, devices, computer-implemented methods, methods, apparatus and/or computer program products are presented that facilitate automatically generating and implementing a template to control spending and cost of hosting one or more workloads at a cloud-based data server, and further automatically determine a current rate of spending compared to an available budget.

According to one or more embodiments, a system is provided to generate and implement a predicted budget template with which to automatically compare a current cost and control operation of a data server in the event of the current cost is too high a percentage of the available budget. The system can comprise at least one processor, and a memory coupled to the at least one processor and having instructions stored thereon, wherein, in response to the at least one processor, the instructions facilitate performance of operations. The operations can comprise configuring a template to be usable to control operation of a data server, wherein the template can comprise action data representative of actions associated with respective percentage spends of a predicted operating budget for the data server. In a further embodiment, in response to determining a first operational usage at the data server correlates to a first percentage spend of the respective percentage spends of the predicated operating budget, implementing an action in the actions configured to be applicable to the first percentage spend of the predicted operating budget. In an embodiment, the data server can be located in a cloud-based data server system.

In a further embodiment, the operations can further comprise receiving a workload to be hosted by the data server, further determining a budget to service the workload over a duration of time on the data server, resulting in a determined budget, and further generating the predicted operating budget from the determined budget to service the workload over the duration of time on the data server.

In an embodiment, the action can comprise at least one of reducing available resources enabled via the data server or limiting user access to a collection of data servers comprising the data server. In a further embodiment, the user access can be limited based on user role.

In a further embodiment, the action can be a first action of the actions, and the operations further comprise, in response to determining a second operational usage at the data server correlates to a second percentage spend of the respective percentage spends of the predicated operating budget, adjusting operation of the data server from the first action to a second action in the actions configured to be applicable to the second percentage spend of the predicted operating budget. In an embodiment, the second action can comprise at least one of increasing available resources enabled via the data server or increasing a variety of user roles able to access the data server.

In a further embodiment, the operations can further comprise generating the predicted operating budget for the data server based on at least one prior workload previously completed via the data server. The operations can further comprise receiving a defined operating budget for the data server, wherein the defined operating budget is disparate to the predicted operating budget for the data server, further normalizing the predicted operating budget by applying the defined operating budget to the predicted operating budget, to generate a normalized operating budget, and further reapplying the actions based on the normalized operating budget.

In another embodiment, the operation of the data server can be controlled for a duration of time, wherein the predicted operating budget for a first period in the duration of time can be less than or equal to the predicted operating budget for a second period in the duration of time, wherein the first period in the duration of time is prior to the second period in the duration of time.

In a further embodiment, the data server can be a first data server located in a first cloud data server, operating with a first control application, wherein the system further comprises a second data server located in a second cloud data server operating with a second control application. The operations can further comprise configuring a common interface to communicate with the first control application and the second control application, wherein the first control application and the second control application utilize disparate control software protocols.

In other embodiments, elements described in connection with the disclosed systems can be embodied in different forms such as computer-implemented methods, computer program products, or other forms. In an embodiment, the computer-implemented method can comprise monitoring, by a device comprising at least one processor, a current cost to host a workload currently being implemented via a data server, further comparing, by the device, the current cost with an assigned budget assigned to host the workload at the data server, and in response to determining the current cost exceeds a defined percentage of the assigned budget, limiting, by the device, resources available at the data server that are usable to host the workload.

In a further embodiment, the current cost is a first cost, and the method further comprising in response to determining a second cost is less than a defined percentage of the assigned budget, increasing, by the device, resources available at the data server that are usable to host the workload, wherein the second cost is determined subsequent to the first cost.

In a further embodiment, the method can further comprise generating, by the device, a budget prediction template based on the assigned budget, wherein the budget prediction template comprises a group of zones relating to respective percentages of the assigned budget to host the workload at the data server, wherein the first cost can be determined to correspond to a first zone in the group of zones and the second cost can be determined to correspond to a second zone in the group of zones.

In a further embodiment, the method can comprise analyzing, by the device, historical data to determine the assigned budget, wherein the historical data comprises a cost to implement the workload on the data server previously.

In an embodiment, the method can further comprise receiving, by the device, an instruction comprising a percentage setting applicable to the assigned budget, and further configuring, by the device, the defined percentage of the assigned budget according to the percentage setting.

Another embodiment can further comprise a computer program product stored on a non-transitory computer-readable medium and comprising machine-executable instructions, wherein, in response to being executed, the machine-executable instructions cause computing equipment to perform operations, the operations comprising generating a budget prediction template, the budget prediction template comprising: an upper threshold indicating a defined budget to host a workload on a data server, and a group of zones defined according to the upper threshold, wherein: (a) a first zone in the group of zones defines a first cost to host the workload, a first action being defined for the first zone, and (b) a second zone in the group of zones defines a second cost to host the workload, a second action being defined for the second zone and the second cost being different than the first cost. The operations can further comprise analyzing a current cost to host the workload via the data server relative to the first cost and the second cost, and (a) in response to determining, based on the analyzing, that the current cost matches the first cost, implementing the first action, or (b) in response to determining, based on the analyzing, that the current cost matches the second cost, implementing the second action.

In an embodiment, the first action can comprise at least one of reducing resources at the data server available to host the workload or limiting ability of one or more user roles to access the data server, and the second action can comprise at least one of increasing resources at the data server available to host the workload or increasing the ability of the one or more user roles to access the data server.

In an embodiment, the defined budget can be based on a past budget previously available to host the workload on the data server.

In a further embodiment, the budget prediction template can comprise duration data corresponding to a duration of time for which the workload is to be hosted via the data server, wherein the duration comprises a consecutive sequence of time periods during which implementation of the workload on the data server is to be measured, and wherein the upper threshold corresponds to a limit on budget available to host the workload for each period in the sequence of time periods.

DESCRIPTION OF THE DRAWINGS

One or more embodiments are described below in the Detailed Description section with reference to the following drawings:

FIG. 1 presents an overview of a multi-cloud budget control system and implementation to control a client's expenditure regarding servicing their workloads on a cloud-based data server system, in accordance with one or more embodiments.

FIG. 5 presents a budget control system further expanding on components and concepts presented in FIG. 1, in accordance with one or more embodiments.

FIG. 8 illustrates a computer-implemented process for combining monitoring and control of two or more cloud servers by a single system, according to one or more embodiments.

FIG. 9 illustrates a computer-implemented process for generating a budget prediction template, according to one or more embodiments.

DETAILED DESCRIPTION

Figures 2A, 2B:
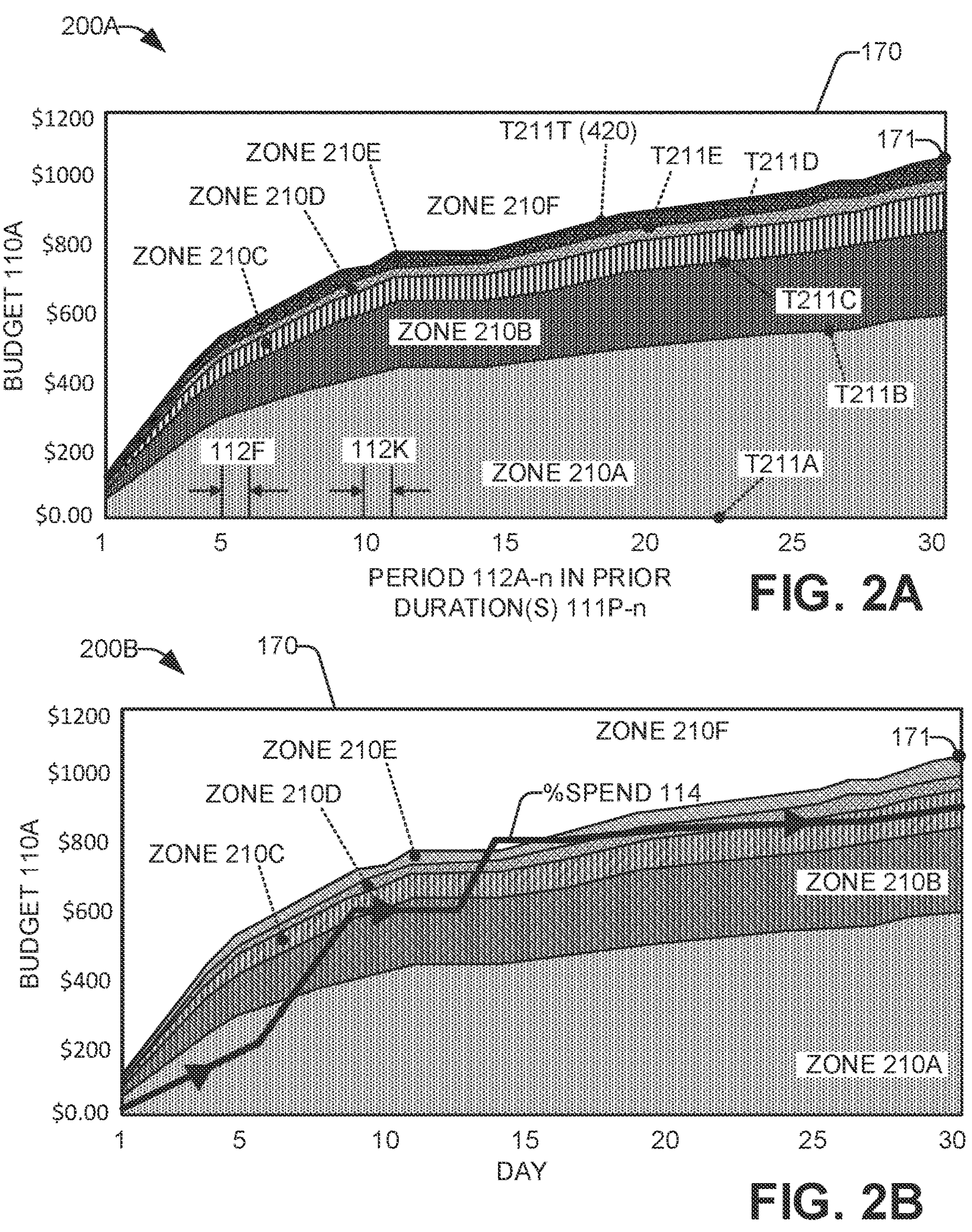
FIG. 2A presents a budget prediction template indicating predicted budget and associated actions for a duration of time, in accordance with an embodiment.
FIG. 2B presents a budget prediction template with an example of % Spend versus budget over a given duration, in accordance with an embodiment.

The following detailed description is merely illustrative and is not intended to limit embodiments and/or application or uses of embodiments. Furthermore, there is no intention to be bound by any expressed and/or implied information presented in any of the preceding Background section, Summary section, and/or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Ranges A-n are utilized herein to indicate a respective plurality of devices, components, statements, attributes, workloads, etc., where n is any positive integer.

The term workload(s) is used herein to convey the various activities associated with processing/hosting data (e.g., in a digital format, code, information) at one or more data servers/centers and the various operations, applications, processes, workflows, computations, analytics, algorithm execution, maintaining, updating, and the like, performed on the data as a function of a client's activity regarding the data.

Workload activities can range, for example, from storing and maintaining data on a data server, through to executing algorithms to analyze and/or modify the data (e.g., as a function of operations performed at a data center and/or remotely), transmission of data, receiving one or more instructions regarding processing of the data, updating data, replicating data, and the like.

The various embodiments presented herein can be implemented in a cloud data server/data center environment to facilitate improving operational efficiency of one or more data servers (aka server(s)) at the data center, wherein the one or more servers can be co-located in a server cluster (aka a cloud server) comprising two or more servers.

The various embodiments presented herein can be utilized by a data server provider (also known as a vendor) operating a cloud server comprising one or more data servers, wherein the cloud server can be accessed by a single client (aka entity, customer, user, organization) and/or multiple clients, entities, etc. The embodiments presented herein can also be utilized by a client to monitor and control their operational usage/cost of workloads hosted by the data server provider.

A cloud server(s) can comprise of multiple data servers clustered/pooled to form a centralized server resource that is hosted and delivered over a network, e.g., "over the cloud" via the Internet, and accessed on demand by one or more clients. Further, a cloud server(s) can perform all the same functions of a traditional physical server, delivering processing power, storage, hosting/implementing workloads/applications, and suchlike. While traditional, dedicated server hardware is typically located on premises for exclusive use by one organization, cloud server(s) can be located anywhere on the globe and deliver services remotely through a cloud computing environment.

Operation of a cloud server is possible through virtualization. A management component/software (e.g., a controller, a hypervisor) can be installed/utilized at the cloud server to connect and virtualize the physical, clustered data servers into a single resource, wherein the management component can be configured to abstract/combine the respective resources provided by the available data servers to create a virtual server(s). These virtual resources can be automated and delivered over the cloud for shared use in a single organization or across multiple organizations. Such an approach can be referred to as Infrastructure as a Service (IaaS) model. Clients utilizing IaaS do not have to own and manage the data servers, rather, use of the data servers can be provisioned from a third party, such as a cloud server provider, providing access to the data servers on demand via a public cloud. A common cloud server example is using a public cloud for temporary, seasonal, or variable workloads, wherein the workloads can be quickly scaled up/down in response to operational demand/usage. In another example of use, cloud servers can also be configured as dedicated servers by a cloud server provider. In such a configuration, aka a bare-metal server, the cloud server provider dedicates physical cloud servers to one customer who may have specific storage requirements, performance, or other workload requirements. In this regard, the subject disclosure relates to implementing workloads at data servers, and, more specifically, to utilizing business rules and processes to control, and respond to, usage of a data server in accordance with a client's operational budget.

Some conventional approaches use a static model to budget or balance server usage versus cost analysis for a cloud server provider; however, the ability to analyze and server usage is limited as a result. For instance, a conventional approach for budgeting server usage/cost analysis is for a cloud server provider to simply charge a flat fee without providing knowledge regarding a customer's usage. By billing a flat fee, knowledge/feedback regarding server usage is limited (e.g., what was server usage for day X?, or for days X-Y in a billing cycle?) and can limit a customer's ability to forecast future use/costs. While the costs of cloud resources drop, multi-cloud environments continue to grow, and a client's cloud server expenses may continue to increase. Typically, a cloud server provider may have minimal interest in providing budget-control tools to help a client cut costs, with the cloud server provider charging a client via a pay-per-use model.

A client of a cloud data server can encounter several challenges affecting management of their operational budget, the challenges can include:

Response Delay: cloud server vendors can provide a basic budget monitoring tool that samples the environment over long intervals. Depending on the vendor, these intervals can range anywhere from 1 hour, 24 hours, or even longer. Unfortunately, a long interval may result in client overspend if the client's server usage and associated spending rate accumulates rapidly. For example, a usage measurement at a first moment in time indicates that the volume/degree of server usage is acceptable, however, prior to the second subsequent measurement being performed/received, the usage increases considerably with the client incurring the unanticipated cost, and further, the usage/cost is not able to be addressed at least until after the second measurement is performed and an alarm/notification generated.

Lack of Budget Thresholds: typically cloud providers offer a single budget threshold. When the threshold is crossed, provisioning of the cloud server resources can be immediately terminated in conjunction with the client being notified of the threshold being reached/transitioned. To avoid exceeding the budget, a client can set a budget limit threshold at 80% of the total available budget, ensuring that any additional charges incurred during a delay in measuring a current usage will (a) not exceed the budget and (b) enable the client to act quickly upon receipt of an 80% of budget notification.

Fixed Thresholds: cloud providers can use fixed thresholds based on a fixed amount or percentage (e.g., of the monthly budget, annual budget, and suchlike). However, using such a fixed-budget method is unable to distinguish between scenarios where the client reached, for example, 80% of their budget early in a billing cycle (e.g., on the $2^{nd}$ day of the month) or later in the billing cycle (e.g., the last day of the month).

Minimal reactive/proactive options: in response to a defined budget threshold being reached, a first cloud provider may simply notify a client of the event, while a second cloud provider may invoke a single proactive function, e.g., services at a cloud server are turned OFF/ON in a binary approach. Simply notifying the client does not guarantee that the client will not exceed their spending budget. Further, a cloud server provider implementing a single proactive function based on a threshold being reached can be too generic of a solution/action to a range of options available to service a workload at a cloud server.

Absence of a Unified Solution: different cloud server providers may utilize a variety of disparate budget control strategies, rendering it difficult for a client to learn and implement a single/unified/common budget control system/strategy/solution across different cloud servers/data servers operated by disparate cloud server providers.

In view of at least the foregoing, the various embodiments presented herein utilize a multi-cloud budget control system (BCS) (e.g., a 3rd party system, an agent, and suchlike) which can be located/operated at any suitable location, such as within the client's cloud environment (e.g., as part of an application programming interface (API)), located on-premises with the cloud data servers, etc. The BCS can be configured to periodically sample/measure the respective data server(s) to gain knowledge/understanding of equipment/server usage, workloads, and suchlike, to enable a client's current usage/spending rate/spending habits to be determined and compared with an anticipated, pre-defined budget.

The BCS can be configured to monitor a client's workloads/operations relating to use of the cloud data server, and based thereon, the BCS can be further configured to automatically and dynamically adjust operation of the data servers to prevent client overspend while, in an embodiment, maintaining operation of any required core services for the workloads.

Per the various embodiments presented herein, the BCS can be configured and/or operated by the cloud server provider, by the client, and/or a vendor/client combination.

Compared with conventional cloud data systems, the various embodiments presented herein provide the following advantages:

Realtime Response to Spending Changes: a client can implement a multi-threshold operation strategy performed by a BCS configured to constantly monitor the cloud server environment.

Customized Budget Levels: a client can customize their budget thresholds based on a "red flag" calculated value, whereby the value of the "red flag" can be configured to always be below an over-usage condition, e.g., a business rule is established for server usage equating to 80% of predicted budget. The BCS can be configured to continually/frequently assess one or more operating conditions (e.g., usage) of the cloud server correlated with the client's budget to dynamically update the red flag business rule to align with the client's actual/current pattern of usage of the cloud server. For example, the actual budget amount of 80% red flag value can be dynamically updated throughout a billing cycle, and also monthly, e.g., at the end of a prior billing cycle as part of determining a budget/server usage over a subsequent billing cycle.

Application/Service Control: a client can modify their workloads in various ways beneficial to their affiliated spending rate/amount and corresponding available server activity. One or more workloads can be modified when the spending rate:

a) increases—workload(s) can be scaled down or shut down at a data server, and/or
b) decreases—workload(s) can be restarted/scaled up at a data server.

One application for multi-cloud platforms: the various embodiments can be deployed on any cloud platform, e.g., via application of native APIs. A client can use a single, common BCS to control budgets/operations on disparate cloud server systems across multiple vendors, thereby reducing additional on-boarding and training costs.

In overview, one or more embodiments presented herein comprise:

a) obtaining historical information regarding data server usage for hosting client workloads;
b) obtaining a client budget for hosting the client workloads over a future duration of time;
c) generating, from the historical information, a budget prediction template for the future duration of time, wherein the budget prediction template is separated into zones/thresholds to which respective business rules and associated actions are applied (e.g., when usage is at x % of total budget, throttle down the number of available data servers);
d) implement the budget prediction template to monitor cost of current operational usage of the data servers, from which a percentage spend (% Spend) is determined based on the current usage;
e) identify, in the budget prediction template, a respective zone corresponding to the current % Spend, and implement the business rule/action defined for the identified zone to control servicing of the workloads on the data servers.

FIG. 1, system 100, presents an overview of a multi-cloud budget control system and implementation to control a client's expenditure regarding servicing their workloads on a cloud-based data server system, in accordance with one or more embodiments.

As shown, a collection of data servers 106A-n are combined by a vendor 122 to form a cloud server 105A-n. Operation of the cloud server 105A-n, and the respective data servers 106A-n can be controlled by a local controller 107A-n (e.g., a hypervisor component), wherein a first controller 107A controls operation of cloud server 105A, second controller 107B controls operation of cloud server 105B, etc. The collection of data servers 106A-n respectively combined in a respective cloud server 105A-n can be considered to operate comparable to operation of a cluster of servers.

A client 102 can utilize a cloud server (e.g., cloud server 105A) to implement respective workloads 108A-n. As previously mentioned, client 102 can have a defined budget 110A-n available to compensate/pay vendor 122 for hosting the workloads 108A-n on the cloud server 105A over a budgeted duration of time 111A-n (e.g., a billing cycle per a client account).

Hosting the workloads 108A-n on the cloud servers 105A-n has an associated usage 115A-n regarding memory usage, compute cycle usage, resource utilization, and suchlike at the cloud server 105A-n. For each duration 111A-n, usage 115A-n has an associated cost 116A-n, wherein, per Equation 1, cost 116A-n is derived from a billing rate 117A-n for the usage 115A-n:

$$\text{Cost of Service } 116A = \text{Usage } 115A \times \text{Billing Rate } 117A \quad \text{Eqn. 1}$$

The billing rate 117A-n can be agreed between the vendor 122 and the client 102 (e.g., as part of a vendor-client service agreement). In an embodiment, for a given duration 111A-n, the billing rate 117A-n can be fixed for a given measure of usage 115A-n, with the billing rate 117A-n being known prior to monitoring over duration 111A-n so as to enable prediction of the required budget 110A-n. With a known/fixed billing rate 117A-n, a change in usage 115A-n has an accompanying change in cost 116A-n, wherein lowering a current usage 115A lowers the associated cost 116A, increasing the current usage 115A increases the associated cost 116A.

Per the various embodiments presented herein, usage 115A-n can relate to any of a prior usage (e.g., from which a usage/cost prediction can be generated), a current usage (e.g., as being determined in real-time, or near real-time), or a future usage (e.g., as a predicted usage).

Each budget duration 111A-n can be separated into sub-durations of time: periods 112A-n. Durations 111A-n and periods 112A-n can be configured with any required time, e.g., durations 111A-n represent monthly billing cycles with periods 112A-n being respective days in each month, alternatively durations 111A-n can have a length of 24 hours with periods 112A-n representing each hour in the 24 hour duration, and suchlike.

Further, per Equation 2, as cost 116A-n changes, there is a corresponding change in the cost of performing workloads 108A-n as a percentage of available budget 110A-n for a particular period 112A-n, where:

$$\%\text{Spend } 114 = \frac{\text{available budget } 110A\text{–}n \text{ at period } 112A\text{–}n}{\text{cost } 116A\text{–}n \text{ at period } 112A\text{–}n} \quad \text{Eqn. 2}$$

as further described, per FIGS. 2A and 2B.

In an embodiment, one or more users 118A-n associated with client 102 can access the cloud server 105A-n, whereby respective users 118A-n can be assigned a role 119A-n (e.g., manager 119M, vice-president (VP) 119V, executive 119E, and suchlike) which, as further described, roles 119A-n can be used to control access/operation of cloud server(s) 105A-n.

A budget control system, BCS 120, can be configured to monitor the respective workloads 108A-n and usage 115A-n of the cloud server 105A in conjunction with the budget 110A-n budgeted by the client 102 for payment(s) to the vendor 122 for hosting the respective workloads 108A-n over a budget duration 111A-n. BCS 120 can be communicatively coupled to cloud servers 105A-n, as well as client 102A-n, vendor 122A-n, users 118A-n, and suchlike, as required per the various embodiments presented herein.

As further described, a single instance of BCS 120 can be configured to monitor/control operation of a collection of cloud servers 105A-n, whereby each cloud server 105A-n can comprise of respective data servers 106A-n, e.g., cloud server 105A includes servers 106$A_{1-n}$, cloud server 105B includes servers 106$B_{1-n}$, etc., while cloud server 105A may utilize a different control/interface software at local controller 107A than control/interface software utilized by cloud server 105B at local controller 107B.

It is to be appreciated that the various embodiments presented herein can be implemented at any suitable location. For example, the BCS 120 can be located local to the cloud server 105A such that, in an embodiment, BCS 120 can be configured and implemented by the vendor 122 in view of prior/current/predicted usage 115A-n. In another embodiment, BCS 120 can be located at client 102's location, e.g., where BCS 120 can function as a software agent and further configured to interface with a collection/group of cloud servers 105A-n, wherein the cloud servers 105A-n may be individually located and operated by disparate vendors 122A-n, such that vendor 122A owns/operates cloud server system 105A, vendor 122B owns/operates cloud server system 105B, and suchlike. In an embodiment, BCS 120 can interface with a range of server controllers/software, such that the BCS 120 interfaces with a first server controller 107A (e.g., via a first API) as well as a second server controller 107B (e.g., via a second API), whereby server controller 107A and server controller 107B are disparate (e.g., use different software, control applications, configurations, etc.), thereby enabling the client 102 to only have to learn/understand operation of BCS 120 rather than the various server controllers 107A-n that may be unique to a particular server system 106A-n in the collection of cloud server systems 105A-n.

BCS 120 can include a budget control component, BCC 130, configured to oversee/monitor usage 115A-n pertaining to the workloads 108A-n used by the client 102 and the associated cost 116A-n/% Spend 114A-n for hosting the workloads 108A-n over one or more durations 111A-n and associated periods 112A-n. As further described, BCC 130 can be configured to generate and utilize a budget prediction template, BPT 170. A BPT 170 can include a set/group/collection/series of usage zones 210A-n and a set/group/collection/series of usage thresholds 211A-n, from which the BCC 130 can be further configured to take one or more actions 135A-n based on a set/group/collection of defined business rules 133A-n. As further described, the actions 135A-n can be based on the operational demand (e.g., usage 115A-n), wherein actions 135A-n can comprise metadata, action data, and suchlike representative of the respective action 135A-n. For example, during period 112A, where % Spend 114A (and associated usage 115A, cost 116A-n) is below a first threshold (e.g., a lower threshold), operation of the cloud server 105A is maintained such that the workloads 108A-n remain unchanged. However, for a period 112B, when % Spend 114B exceeds a second threshold, operation of the cloud server 105A can be throttled such that workloads 108A-n are also throttled. For a third period 112C, where % Spend 114A exceeds a third threshold (e.g., an upper threshold line 211T) operation of the cloud server 105A can be controlled such that the workloads 108A-n are terminated, either temporarily or permanently.

As further shown, BCC 130 can be configured to generate and transmit an instruction 146A-n to the respective controller 107A-n. Generation and transmission of instruction 146A can be based on a current % Spend 114A/budget 110A-n and associated business rules 133A-n/actions 135A-n. In a non-limiting list, instruction 146A can comprise, for example, any of a throttle UP/DOWN operation of the cloud server 105A, temporarily/permanently halt operation of one or more workloads 108A-n, limit server access based on user/operator role 119A-n, and suchlike, as further described.

As further shown, BCS 120 can further include a notification component 140 configured to generate and transmit a notification 145A-n to a respective client 102A-n informing client 102A-n of, in a non-limiting list, a current status of the workloads 108A-n, an operation of the cloud server 105A, one or more effects of usage 115A-n on % Spend 114A-n regarding budget 110A-n, a cost 116A-n, and suchlike. In an embodiment, notification 145A-n can reflect the content of instruction 146A-n. In an example scenario, in the event of % Spend 114A exceeds an upper budget threshold (e.g., threshold line 211T), operation of the cloud server 105A can be throttled/temporarily halted, per instruction 146A, with a notification 145A generated and transmitted to client 102 to initiate resolving a budget 110A-n (e.g., budget 110A-n is increased, one or more operations pertaining to workloads 108A-n are temporarily/permanently terminated, and suchlike). In another example scenario, a first notification 145A sent to client 102A indicates that client 102A's usage 115A and % Spend 114A is well within budget 110A, no further action 135A-n is currently being/was taken. A second subsequent notification 145B sent to client 102A indicates that client 102A's usage 115A and % Spend 114A is often approaching the total of available budget 110A and a) the budget 110A is to be increased, or b) client 102A should terminate one or more current operations/activities to reduce usage 115A's operational demand of cloud server 105A.

As further shown, a variety of data/information can be compiled and stored as historical data 190A-n, wherein historical data 190A-n can comprise any of information regarding workloads 108A-n, budget information 110A-n, billing cycle information in a duration 111A-n, one or more periods 112A-n and information acquired during the periods 112A-n, equipment/operational information regarding cloud servers 105A-n (including respective data servers 106A-n and controllers 107A-n), information regarding clients 102A-n/users 118A-n (e.g., roles 119A-n), prior/current/future usage data 115A-n, cost data 116A-n, % Spend 114A-n for a given/prior period 112A-n and/or for a duration 111A-n, business rules 133A-n, actions 135A-n, instructions 146A-n, notifications 145A-n, zones 210A-n, thresholds 211A-n, and suchlike (as further described). Historical data 190A-n can be utilized to generate BPTs 170A-n, creation of zones 210A-n, thresholds 211A-n, and suchlike (as further described).

As further shown, BCS 120 can be communicatively coupled to/include a computer system 180. Computer system 180 can include a memory 184 that stores the respective computer executable components (e.g., BCC 130, template component 510, monitor component 520, control component 530, data historian 540, notification component 140, and suchlike, as further described herein) and further, a processor 182 configured to execute the computer executable components stored in the memory 184. Memory 184 can further be configured to include database 185, and thus store any of BPTs 170A-n, business rules 133A-n, actions 135A-n, operational data regarding cloud servers 105A-n, data servers 106A-n, server controllers 107A-n, clients 102A-n, budgets 110A-n (e.g., predicted and defined), durations 111A-n, periods 112A-n, usages 115A-n, costs 116A-n, rates 117A-n, instructions 146A-n, notifications 145A-n, requirements 515A-n, zones 210A-n, thresholds 211A-n, similarity indexes $S_{1-n}$, vectors Vn, and suchlike (as further described herein). The computer system 180 can further include a human machine interface (HMI) 186 (e.g., a display, a graphical-user interface (GUI)) which can be configured to present various information including BPTs 170A-n, budgets 110A-n, zones 210A-n, thresholds 211A-n, durations 111A-n, periods 112A-n, prior/current/future usage 115A-n, costs 116A-n, rates 117A-n, business rules 133A-n, actions 135A-n, historical data 190A-n, clients 102A-n, users 118A-n, user roles 119A-n, instructions 146A-n, notifications 145A-n, and suchlike, (as further described) per the various embodiments presented herein. HMI 186 can include an interactive display/screen 187 to present the various information. Computer system 180 can further include an I/O component 188 to receive and/or transmit respectively controller instructions 146A-n, budget 110A-n, duration 111A-n, periods 112A-n, usage 115A-n, cost 116A-n, rate 117A-n, notifications 145A-n, and suchlike. Any suitable technology can be utilized for interaction/communication by I/O 188, e.g., file transfer protocol (FTP), simple radio standalone (SRS), and suchlike.

To provide context regarding dynamically adjusting operation of the cloud servers 105A-n, FIGS. 2A and 2B, charts 200A and 200B present budget prediction templates (thresholds graphs) utilized to determine/control actions, in accordance with one or more embodiments, and TABLE 1 details the respective thresholds 211A-n, business rules 133A-n, and actions 135A-n pertaining to respective usages 115A-n and % Spend 114A-n.

Chart 200A presents a BPT 170 indicating predicted cost 116A of usage 115A-n cumulating over a duration 111P, e.g., 30 days. The x-axis represents duration 111P of prior monitoring (e.g., 30 days prior) and the y-axis represents available budget 110A-n for the given time period 112A-n (e.g., by day) throughout budget duration 111A-n. For example, per FIG. 2, period 112F indicates a sixth day of monitoring in a thirty day budget duration 111A, and period 112K indicates an eleventh day of monitoring in the thirty day budget duration 111A. Predicted budget threshold line 211T is a prediction of future usage 115A-n/cost 116A-n and can be generated from budget prediction line 420, per FIGS. 3-4B, as further described. The steeper a portion of line 211T the greater the predicted usage 115A-n (and associated spend/cost 116A-n) over a particular period of time 112A-n, while the shallower a portion of line 211T the lower the predicted usage 115A-n over a particular period of time 112A-n. Hence, in the example BPT 170, prior usage 115A-n was higher during days 1-5 than between days 20-25 of budget duration 111A-n. Further, for a given period of time 112A-n where the usage 115A-n is zero/minimal, e.g., between days 13 to 15, line 211T extends horizontally from the last position of measured usage 115A-n, however, given the cumulative nature of the usage 115A-n, line 211T does not have a negative slope. As shown, line 211T ends at total budget point TBP 171, where TBP 171 equals the total of available budget 110A-n (e.g., TBP 171 at day 30=budget 110A of $1000).

As further described, zones 210A-n can be applied to BPT 170 wherein the zones 210A-n represent % Spend of a given period 112A-n against the available budget 110A-n. With reference to TABLE 1, in the example scenario presented, BPT 170 is configured with six zones 210A-F, against which a current % Spend 114A-n can be applied. As a current usage 115A-n transitions from one zone 210A-n to an adjacent zone 210A-n, respective business rules 133A-n and actions 135A-n can be applied/implemented.

TABLE 1, below, presents an example series of business rules 133A-F to be respectively applied to BPT 170 based upon usage 115A-n being in a given zone 210A-n over the sequence of time periods 112A-n in budgeted duration 111A-n, e.g., periods 112A-n represent respective days in a 30 day budget duration 111A.

TABLE 1

BUSINESS RULES 133A-n versus USAGE ZONE 210A-n and associated % Spend 114A-n versus a predicted budget 110A-n.

| ZONE | % SPEND 114 OF PREDICTED BUDGET 211T | BUSINESS RULE 133A-n |
|---|---|---|
| 210A | 0-60% | 133A: No restrictions should be set |
| 210B | 60-85% | 133B: Minimal restrictions should be set |
| 210C | 85-95% | 133C: Moderate restrictions should be set |
| 210D | 95-100% | 133D: Maximal restrictions should be set |
| 210E | 100-105% | 133E: Only critical services should remain online |
| 210F | 105% or more | 133F: All services to be shut down |

Reading the example configuration shown in TABLE 1 in conjunction with BPT 170:

a) first usage zone 210A is configured between zero activity threshold 211A and a first threshold 211B, where zone 210A has a usage 115A/cost 116A equating to a % Spend 114A of 0-60% of budget 110A, and a business rule 133A of no restrictions should be set regarding operation of workloads 108A-n on servers 106A-n;

b) second usage zone 210B is configured between first activity threshold 211B and second activity threshold 211C, where zone 210B has a usage 115A/cost 116A equating to a % Spend 114A of 60-85% of budget 110A, and a business rule 133B of minimal restrictions should be set regarding operation of workloads 108A-n on servers 106A-n;

c) third usage zone 210C is configured between second activity threshold 211C and third activity threshold 211D, where zone 210C has a usage 115A/cost 116A equating to a % Spend 114A of 85-95% of budget 110A, and a business rule 133C of moderate restrictions should be set regarding operation of workloads 108A-n on servers 106A-n;

d) fourth usage zone 210D is configured between third activity threshold 211D and fourth activity threshold 211E, where zone 210D has a usage 115A/cost 116A equating to a % Spend 114A-n of 95-100% of budget 110A, and a business rule 133D of maximal restrictions should be set regarding operation of workloads 108A-n on servers 105A-n;

e) fifth usage zone 210E is configured between fourth activity threshold 211E and fifth activity threshold 211T, where zone 210E has a usage 115A/cost 116A equating to a % Spend 114A-n of 100-105% of budget 110A, and a business rule 133E of only critical services at servers 105A-n should remain online regarding operation of workloads 108A-n; and f) sixth usage zone 210F is configured to be above fifth activity threshold 211T, where zone 210F has a usage 115A/cost 116A equating to a % Spend 114A-n of >105% of budget 110A, and a business rule 133F of all services at servers 105A-n should be shut down regarding operation of workloads 108A-n (e.g., >105% of budget 110A).

As shown, a respective percentage of the budget 110A for a given period 112A-n is measured against the particular portion of budget 110-*n* for that particular period 112A-n. For example, at day 5, 60% zone 210A/threshold 211B is at ~$300, while at day 30, 60% zone 210A/threshold 211B is at $600.

It is to be appreciated that any settings and actions 135A-n can be applied to the business rules 133A-n, and further, the business rules 133A-n can be reconfigured/normalized as necessary in response to available budget 110A-n and usage 115A-n (e.g., predicted and/or actual) over a respective monitoring period 112A-n and budget duration 111A-n of interest.

TABLE 2

EXAMPLE CONFIGURATION OF BUSINESS RULES 133A-n.

| | SERVER TYPE/USE | | |
|---|---|---|---|
| | PROD. WEB SERVER | INVENTORY DATABASE | BUSINESS INTELLIGENCE APPLICATION |
| | ACTION | | |
| ZONE | SINGLE MODE OPERATION | MULTI-MODE OPERATION | MULTI-MODE OPERATION |
| 210A/135A | UP | FULL AUTOSCALING | ALL ACCESS |
| 210B/135B | UP | SCALE UP TO 10 | MANAGER 119M & ABOVE ACCESS |
| 210C/135C | UP | SCAPE UP TO 5 | VP 119V & ABOVE ACCESS |
| 210D/135D | UP | SCALE UP TO 2 | C-LEVEL (EXECUTIVE) 119E ACCESS ONLY |
| 210E/135E | UP | DOWN | DOWN |
| 210F/135F | DOWN | DOWN | DOWN |

TABLE 2 presents respective example actions 135A-n that can be performed depending upon the workloads 108A-n and/or operating conditions being controlled by BCC 130 via application of the business rules 133A-n presented in TABLE 1, where business intelligence applications can include enterprise resource planning (ERP), business decision-making, sales, marketing, and suchlike.

Per TABLE 2, BCC 130 can utilize business rules 133A-n to categorize the workloads 108A-n, and the associated actions 135A-n, according to the following, non-limiting, example types:

Single-Mode Applications: workloads 108A-n at a production web server 105A-n can have a single operation/binary mode, where the servers 105A-n/workloads 108A-n are either considered UP (operational) or DOWN (offline).

Multi-Mode Applications: these workloads 108A-n can have multiple operation modes, whereby workloads 108A-n can be configured to consume (auto-scale) more or less resources at servers 105A-n by changing any of, in a non-limiting list:

a) the respective auto-scaling settings for data servers 106A-n, and/or b) access permissions based on user role 119A-n (e.g., all access, manager 119M and above only, vice-president 119V and above only, executive-level 119E only), and suchlike.

FIG. 2B, chart 200B presents an example of % Spend versus budget over a given duration, in accordance with an embodiment. As shown, a plot of current % Spend 114A is overlaid onto a BPT 170, with usage 115A extending from day 1 through to day 30 of duration 111A. In the example presented in FIG. 2B, % Spend 114A is presented for the entirety of the 30 day duration 111A, however, during a billing cycle, as measurement of usage 115A progresses, % Spend 114A is plotted on BPT 170 as respective measurements are received and compared with the business rule 133A-n for the particular zone 210A currently being navigated by updating plot of % Spend 114A.

In the example scenario(s) presented in FIG. 2B, the six zones 210A-E of FIG. 2A are utilized by BCC 130 to monitor/control operation of a cloud server 105A utilized by a client 102A. During an initial 6 day period 112A-n, % Spend 114A is determined by BCC 130 to be in the first zone 210A equating to the lowest demand 0-60% of usage 115A. % Spend 114A increases between day 6 and day 8, such that by day 8% Spend 114A is in zone 210C. Between day 8 and day 13, % Spend 114A plateaus (e.g., as a result of cloud server 105A scaled or workloads 108A-n naturally reducing) with % Spend 114A reflecting the cost of cumulative usage 115A being in zone 210B. However, between days 13 and 14, cumulative usage 115A/cost 116A-n has a % Spend 114A placing usage 115A in zone 210F, and given % Spend 114A is greater than 105% of the cumulative budget 110A for this period 112A, BCC 130 is configured to temporarily throttle down all available servers 106A-n in cloud server 105A and prevents all business intelligence applications from being performed, regardless of user role 119A-n.

During days 14-16, with operation of the servers 106$A_{1-n}$ effectively terminated, usage 115A has no associated cost 116A with usage 115A plateaued, causing % Spend 114A to eventually move into zone 210E where any production web-server operations may be performed (per business rule 133E). Continued control of operation of servers 106$A_{1-n}$ by BCC 130 over days 16-30 eventually brings usage 115A into accordance with budget 110A such that by day 30, the cumulative cost 116A of usage 115A causes % Spend 114A to be in zone 210C, whereby, per business rule 133C, available actions 135A-n comprise the single-mode of the production web server can be UP, the multi-mode database can utilize 5 data servers in data servers 106$A_{1-n}$, and/or the multi-mode implementation of business intelligence applications can be limited to roles of vice-president 119V and above. As shown in FIG. 2B, at final day 30 of duration 111A, usage 115A and associated cost 116A/% Spend 114A is less than threshold 211T/TBP 171, indicating that management of servers 106$A_{1-n}$ servicing workloads 108A-n has kept total cost 116A within the budget 110A (e.g., less than the budgeted $1000).

Accordingly, depending upon the respective use case/scenario, BCC 130 and server controller 107A-n can interact to assign/allocate/throttle servers 106$A_{1-n}$ to support the implementation of the workloads 108A-n, and further access to the respective servers 106A-n can be restricted to activities assigned to a particular user role 119-*n*. As shown, in the example scenarios, as the % Spend 114A exceeds the available/assigned budget 110A for a given period 112A-n in duration 111A, access to/access of the respective servers 106$A_{1-n}$ can be throttled, terminated, etc., to be subsequently addressed between vendor 122 and client 102, e.g., increase future budget 110F to accommodate increased usage 115F, terminate one or more workloads 108A-n, increase number of servers 106$A_{1-n}$ available to perform the workloads 108A-n (with an anticipated increase in budget 110F), and suchlike.

In an embodiment, a client 102A can divide their workloads 108A-n using the above example categorizations and further decide how each workload 108A-n should operate within each defined zone 210A-n as defined by respective placement of thresholds 211A-n.

Figure 3:
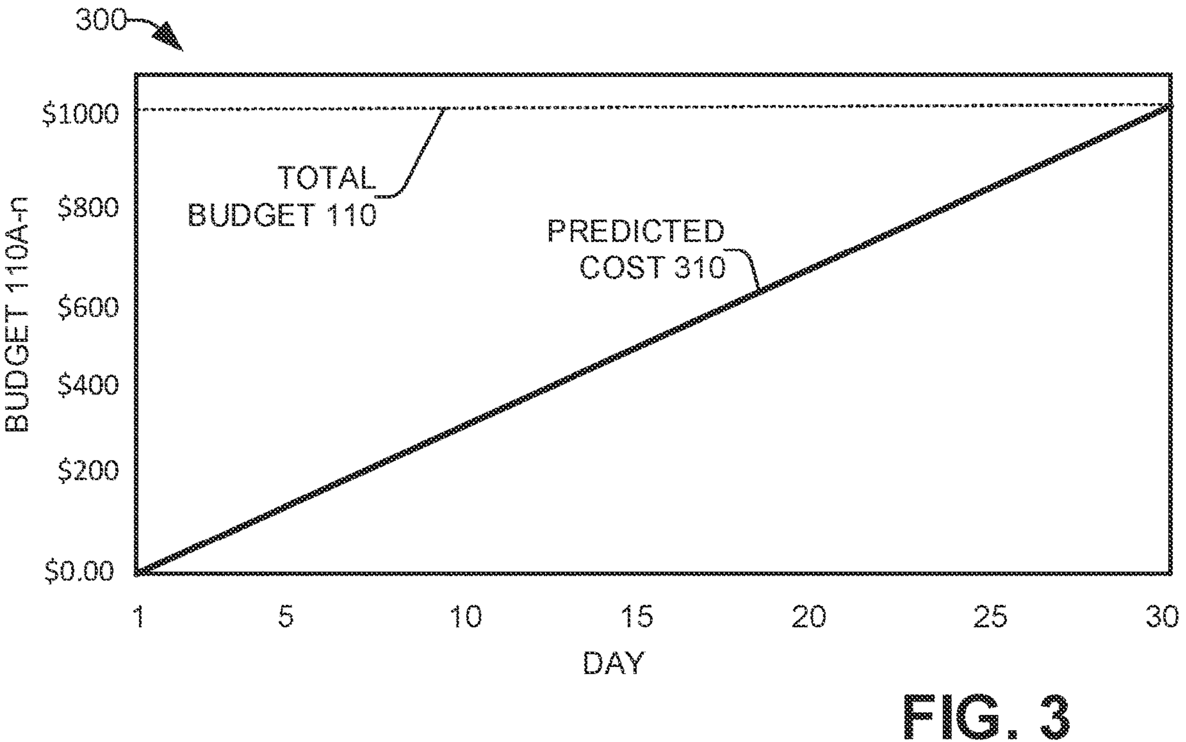
FIG. 3 illustrates budget prediction template generated with a constant budget applied over a duration of time, in accordance with one or more embodiments.
Figure 4A:
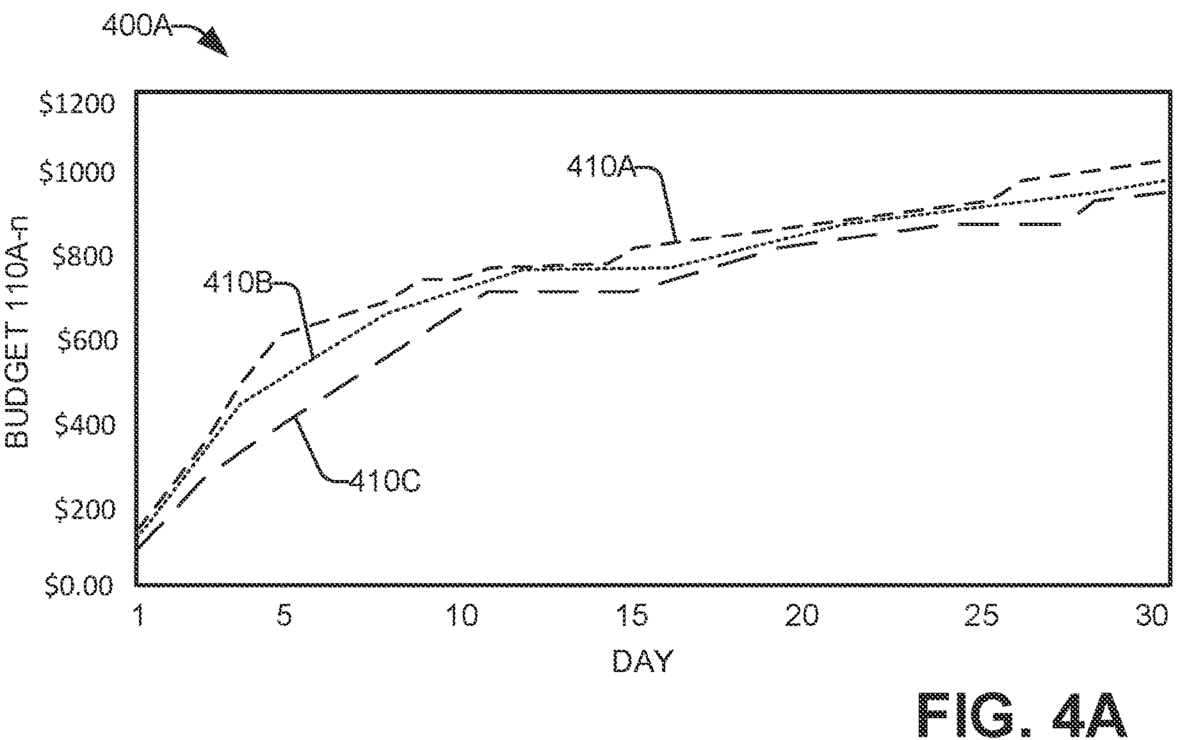
FIG. 4A presents historical data being compiled to generate a budget prediction template, according to one or more embodiments.
Figure 4B:
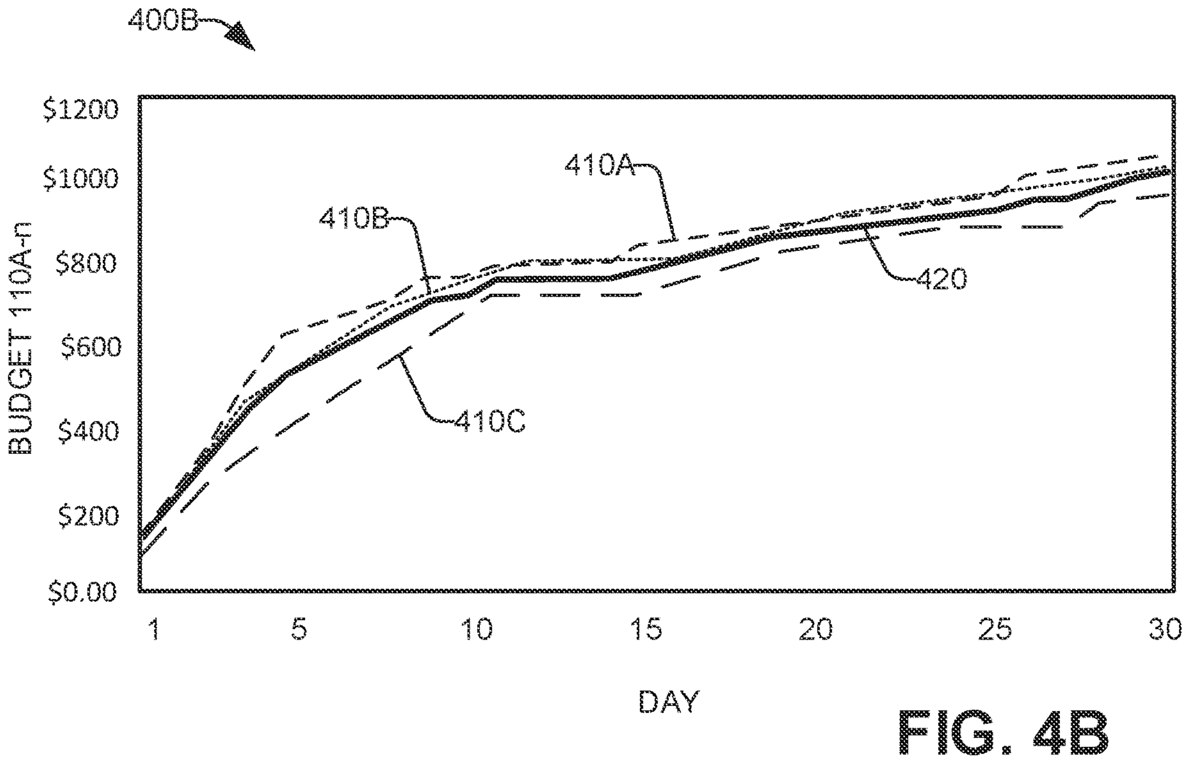
FIG. 4B presents a predicted budget being generated from historical data, according to one or more embodiments.

Turning momentarily to FIGS. 3, 4A, and 4B, respective charts 300, 400A, and 400B provide further context regarding generation of BPT 170A-n and % Spend 114A-n presented in FIGS. 2A and 2B, and how knowledge regarding a budget 110A versus cumulative usage 115A-n/cost 116A-n can be utilized as % Spend 114A to generate the respective business rules 133A-n and actions 135A-n, in accordance with one or more embodiments. FIGS. 4A and 4B can be read in conjunction with FIGS. 2A and 2B regarding how business rules 133A-n can be generated based on historical usage 115H in historical data 190A-n.

In a rudimentary example approach, as depicted in FIG. 3, client 102's budget 110A-n is defined on a per-month duration 111A-n, with the assumption that client 102's usage 115A-n and % Spend 114A is constant over the duration of the month, e.g., the monthly budget can be portioned across the billing cycle, whereby each daily period 112A-n receives the same % Spend 114A amount of budget. For example, day 1 has an assigned budget $X.XX, day 2 similarly receives budget $X.XX, day 15 receives similar budget $X.XX. Therefore, per Equation 3, the expected/cumulative costs 116A-n for each daily period 112A-n should not exceed, for usage 115A-n, over duration 111A-n:

$$\text{Daily Budget (\%Spend } 114A) = \frac{\text{Day of the Month}}{\text{Total Days in Month}} \times \text{Total Budget} \qquad \text{(Eqn. 3)}$$

For example, a budget 110E of $1000 applied over a 30 day duration 111E provides a daily budget of $33.33/day, where each time period 112A=1 day. With the constant amount of budget 110E/30 days assigned to each day, the slope of the line 310 (e.g., predicted daily cost 116E for each daily period 112E) is consistently cumulative and smooth for % Spend 114A.

However, the approach of assigning a fixed amount of budget 110A-n to the system 105A for each time period 112A-n (e.g., each day) does not allow for dynamic changes in usage 115A-n or % Spend 114A. For example, client 102A's operations may place high operational demand/usage 115A-n during the start of each monthly billing cycle 111M but the rate of cost 116M accumulating lessens later in the billing cycle 111M, such that the total cumulative cost 116M for cumulative usage 115A-n for the month does not exceed the assigned monthly budget 110M.

As previously mentioned, historical data 190 can be utilized to generate a BPT 170A-n comprising a predicted budget 110P/usage 115P from either of a prior budget 110A-n and/or prior % Spend 114A-n in historical data 190A-n. Per the example shown in FIG. 4A, historical data 190 comprising prior predicted budgets 110A-n has been obtained for three prior months of budget control, per lines 410A, 410B, and 410C. Per FIG. 4B, a budget prediction line 420 is generated (e.g., by template component 510) based on lines 410A-C (e.g., an average of lines 410A-C). As shown, for each of the prior months lines 410A-C, the usage 115A-n (and corresponding cost 116A-n and % Spend 114A) was initially high and then reduced/flattened off towards the end of the respective billing cycles 111A, 111B, 111C. Budget prediction line 420 generated per FIG. 4B forms the 100% of budget threshold line 211T of FIG. 2. Hence, by utilizing historical data 190A-n in predicting the usage 115A-n to generate budget prediction line 420, the respective percentages of use (per business rules 133A-n in TABLE 1) can be applied to budget prediction line 420 to generate FIG. 2, in conjunction with the respective actions 135A-n assigned in TABLE 2. Accordingly, with knowledge of any prior budget 110A-n, prior % Spend 114A-n, prior usage 115A-n, and/or prior cost 116A-n it is possible to dynamically implement business rules 133A-n/actions 135A-n that take into account a variation in usage 115A-n and % Spend 114A-n over the period of budget 110A rather than statically applying a % Spend 114A-n per the example presented in FIG. 3.

BCC 130 can be configured to monitor (e.g., using monitor component 520) the current usage 115C/current cost 116C to track whether implementing workloads 108A-n caused/causes the % Spend 114A (and associated usage 115C and associated cost 116C) to transition across respective boundary thresholds 211A-n, e.g., between a first zone 210A-n to a second zone 210A-n to another. Such activity of % Spend 114A-n can include:

a) current % Spend 114C moves to a more restrictive zone, e.g., from zone 210D to zone 210E, such as when a first measure of usage 115C relatively increased to a second measure of usage 115C.
b) current % Spend 114C moves to a less restrictive range, e.g., from zone 210F to zone 210C via zones 210D and 210E, e.g., resulting from a third measure of usage 115C relatively decreased to a fourth measure of usage 115C.

Generally, any time % Spend 114A-n changes with associated changes in operational usage 115A-n and cost 116A-n, BCS 120 and associated subcomponents, can apply/implement the respective business rules 133A-n. In an example scenario, in the event of the % Spend 114A-n transitions from zone 210A to a more restrictive zone 210B, per the example configurations presented in TABLE 2, action 135A maintains the operational condition of a "Production Web Server" as "UP", hence, workloads 108A-n for this configuration/operation of data servers $106A_{1-n}$ remain unaffected. However, for data servers $106A_{1-n}$ hosting workloads 108A-n having an "Inventory Database" operation, BCS 120 can be configured to autoscale/throttle back the available data servers $106A_{1-n}$ to only 10 data servers $106A_{1-10}$ available to implement workloads 108A-n which may affect operation of the workloads 108A-n. Further; for data servers $106A_{1-n}$ hosting workloads 108A-n pertaining to the "Business Intelligence Application" permissions are limited to a role 119M of "Manager and above" access which may affect workloads 108A-n.

In another example scenario, in the event of the % Spend 114A-n moves from zone 210E to a less restrictive zone 210D, per the example configurations presented in TABLE 2, operational settings of a "Production Web Server" remain in the UP condition with workloads 108A-n not being operationally affected; for data servers $106A_{1-n}$ hosting workloads 108A-n having an "Inventory Database" operation, BCS 120 can be configured to autoscale/bring back online 2 data servers $106A_{1-2}$ which can improve implementation of workloads 108A-n; further, for data servers $106A_{1-n}$ hosting workloads 108A-n pertaining to the "Business Intelligence Application" permissions, operations at the data servers $106A_{1-n}$ are brought back online with permissions limiting access to the "executive-level" roles 119E only. Hence, in this example, only 2 data servers $106A_1$ and $106A_2$ in cloud server 105A may be available for use, with use limited to "executive-level" roles 119E only.

FIG. 5, system 500 further expands on components and concepts presented in FIG. 1, in accordance with one or more embodiments. As previously mentioned, BCS 120 can be communicatively coupled to one or more cloud servers 105A-n, whereby the cloud servers 105A-n are operated by vendor 122 to service workloads 108A-n for one or more clients 102A-n. BCS 120 can include a BCC 130 configured to automatically monitor and dynamically control implementation of the workloads 108A-n based on the respective spending (e.g., per usage 115A-n and cost 116A-n) by client 102 relative to client 102's budget 110A-n.

As shown, BCC 130 can be communicatively coupled to other components configured to facilitate the respective embodiments presented herein. In an embodiment, BCS 120 can include a template component 510 configured to analyze prior budget 110A-n and % Spend 114P for a given prior duration 111P (as previously described), e.g., for respective prior months of usage, a usage of a similar calendar period 112A-n (e.g., usage over Xmas period for previous three years, usage during tax season for prior five years, and suchlike). In another embodiment, client 102 can deploy a new business model comprising a series of new workloads 108A-n to the cloud server 105A, from which an anticipated usage can be ascertained by the template component 510. Based on the new workloads 108A-n, template component 510 can be further configured to generate a predicted budget line 211T in accordance with the new information regarding workloads 108A-n, to which the respective business rules 133A-n and actions 135A-n can be applied to 0-60% usage, 60-80% usage, and suchlike) can be applied by the template component 510. An initial cost 116A-n versus time/day 112A-n can be generated by the template component 510 as a baseline configuration 211T to which the various embodiments presented herein can be applied.

Template component 510 can be further configured to enable configuration of the respective zones 210A-n, thresholds 211A-n, etc., to create BPT 170A-n against which the current % Spend 114A-n is compared. In an embodiment, template component 510 can be interactive, with client 102 adjusting placement of the respective zones 210A-n, thresholds 211A-n, etc., auto-generated by template component 510. For example, client 102 knows future usage 115F will not be comparable to a prior usage 115P, accordingly, client 102 can adjust positions of zones 210A-n, etc., as needed in accordance with future usage 115F and associated % Spend 114A-n.

In a further embodiment, template component 510 can be configured to receive and implement requirements 515A-n from client 102 regarding the business rules 133A-n, actions 135A-n, etc., such as requirements 515A-n include new ranges for % of Predicted % Spend/Budget (per TABLE 1), new business rules 133A-n, and/or new actions 135A-n to be implemented. Further, requirements 515A-n can include an amount for budget 110A-n, a length of time for duration 111A-n, and length of time(s) for period 112A-n, number of zones 210A-n, number of thresholds 211A-n, and suchlike.

BCS 120 can include a monitor component 520 configured to monitor operation of the cloud data server 105A-n and included data servers 106A-n with regard to implementing the workloads 108A-n. Monitor component 520 can be configured with the applied rate 117A-n from which cost 116A-n of current usage 115A-n can be determined and compared by the monitor component 520 with the predicted budget 110A-n for the respective period 112A-n, with the % Spend 114A-n determined therefrom. Monitor component 520 can be further configured to compare a determined current % Spend 114A-n with the predicted portion of budget 110A-n for the period 112A-n to determine a zone 210A-n for which the % Spend 114A-n pertains. Based on the determined zone 210A-n, the monitor component 520 can be configured to identify the business rules 133A-n and actions 135A-n pertaining to the % Spend 114A-n.

Template component 510 can be configured to forward the BPT 170A-n to both the monitor component 520 and a control component (e.g., control component 530). Monitor component 520 can further communicate the respective actions 135A-n to a control component 530 to enable adjustment of operation of the data servers 106A-n.

A control component 530 can be included in BCS 120, with control component 530 configured to generate and transmit instructions 146A-n to the server controller 107A-n, e.g., in accordance with implementing an action 135A-n. For example, instruction 146A-n can include a requirement for server controller 107A to throttle/increase the available resources (e.g., servers $106A_{1-n}$) in view of the current % Spend 114A-n, usage 115A, and action 135A.

BCS 120 can further include a data historian 540 configured to compile the respective information from across systems 100/500 to generate the historical data 190A-n, as previously mentioned. Data historian 540 can be configured to compile historical data 190A-n and further store/retrieve historical data 190A-n to/from the memory 184/database 185, as required.

BCS 120 can include a process component 560 and processes 566A-n. It is to be appreciated that processes 566A-n can comprise any artificial intelligence/machine learning (AI/ML) model/technology/technique/architecture utilized to automatically generate BPTs 170A-n and further automatically control operations at one or more cloud data servers 105A-n, wherein BPTs 170A-n can be generated based on a budget 110A-n and also workloads 108A-n, etc., and information available in historical data 190A-n. Process component 560 can be utilized to implement processes 566A-n in conjunction with any of the other components included in BCS 120, e.g., BCC 130, template component 510, monitor component 520, control component 530, data historian 540, notification component 140, cloud data servers 105A-n, controllers 107A-n, data servers 106A-n, and suchlike.

It is to be appreciated that the various processes 566A-n and operations presented herein are simply examples of respective AI and ML operations and techniques, and any suitable technology can be utilized in accordance with the various embodiments presented herein. Processes 566A-n can be based on budget amounts 110A-n, usage 115A-n requirements, workload 108A-n volume/complexity, durations 111A-n and periods 112A-n, requirements 515A-n, and suchlike. In an example embodiment, processes 566A-n can include a vector component to apply any suitable vectoring technology, such as bag of words (BOW) text vectors, Euclidean distance, cosine similarity, etc. Other suitable AI/ML technologies that can be applied can include, in a non-limiting list, any of vector representation via term frequency-inverse document frequency (tf-idf) capturing term/token frequency in the respective prior/current/future budgets 110A-n, durations 111A-n, periods 112A-n, usages 115A-n, costs 116A-n, instructions 146A-n, notifications 145A-n, requirements 515A-n, neural network embedding layer vector representation of terms/categories (e.g., common terms having different tense), a transformer neural network, bidirectional and auto-regressive transformer (BART) model architecture, a bidirectional encoder representation from transformers (BERT) model, long short term memory network (LSTM) operation(s), a sentence state LSTM (S-LSTM), a deep learning algorithm, a sequential neural network, a sequential neural network that enables persistent information, a recurrent neural network (RNN), a convolutional neural network (CNN), a neural network, capsule network, a machine learning algorithm, a natural language processing (NLP) technique, sentiment analysis, bidirectional LSTM (BiLSTM), stacked BiLSTM, and suchlike. Accordingly, in an embodiment, implementation of the BCC 130, template component 510, monitor component 520, control component 530, data historian 540, notification component 140, and suchlike, with processes 566A-n, enables natural language processing (NLP) (e.g., utilizing vectors) to be implemented to generate and utilize a BPT 170A-n.

Language models, LSTMs, BARTs, etc., can be formed with a neural network that is highly complex, for example, comprising billions of weighted parameters. Training of the language models, etc., can be conducted, e.g., by process component 560, with datasets, whereby the datasets can be formed using any suitable technology, such as current/prior budgets 110A-n and current/prior usages 115A-n, information in historical data 190A-n, and suchlike. The budgets 110A-n, usages 115A-n, etc., can be available from many sources, e.g., prior implementation of a BPT 170P, as well as provided by a client 102, provided by a user 118A-n, and suchlike, to generate BPTs 170A-n and implementation of BPTs 170A-n.

Fine-tuning of a process 566A-n can comprise application of a current/prior BPTs 170A-n and current/prior actions 135A-n, and suchlike to the process 566A-n, process 566A-n is correspondingly adjusted by application of the current/prior BPTs 170A-n (and associated amendments/edits), and suchlike, such that, for example, weightings in the process 566A-n are adjusted by application of the current/prior BPTs 170A-n, actions 135A-n, business rules 133A-n, and suchlike.

During application of processes 566A-n, vector representations V1-*n* can be applied to any of prior and current BPTs 170A-n, budgets 110A-n, durations 111A-n, usages 115A-n, costs 116A-n, rates 117A-n, roles 119A-n, instructions 146A-n, notifications 145A-n, requirements 515A-n, such that vector similarity operations (e.g., vector clustering/distancing) can be applied to generate a future BPT 170F from the accrued prior knowledge regarding generation and implementation of prior BPTs 170A-n. The degree of similarity (e.g., via similarity indexes $S_{1-n}$) between respective information can be determined, for example, based on a threshold reflecting a proximity of a first vector generated from information pertaining to a current BPT 170C and a second vector generated from information pertaining to a prior BPT 170P, enabling ranking of similarity, e.g., via vector quantization.

It is to be appreciated that BCC 130, notification component 140, template component 510, monitor component 520, control component 530, data historian 540, and process component 560, can function as separate components/implemented independently, the respective components and functionality can be combined into a single component, such as BCC 130 operating as a single, high-level component, with one or more of notification component 140, template component 510, monitor component 520, control component 530, data historian 540, and process component 560, operating as a sub-component of BCC 130.

Figure 6:
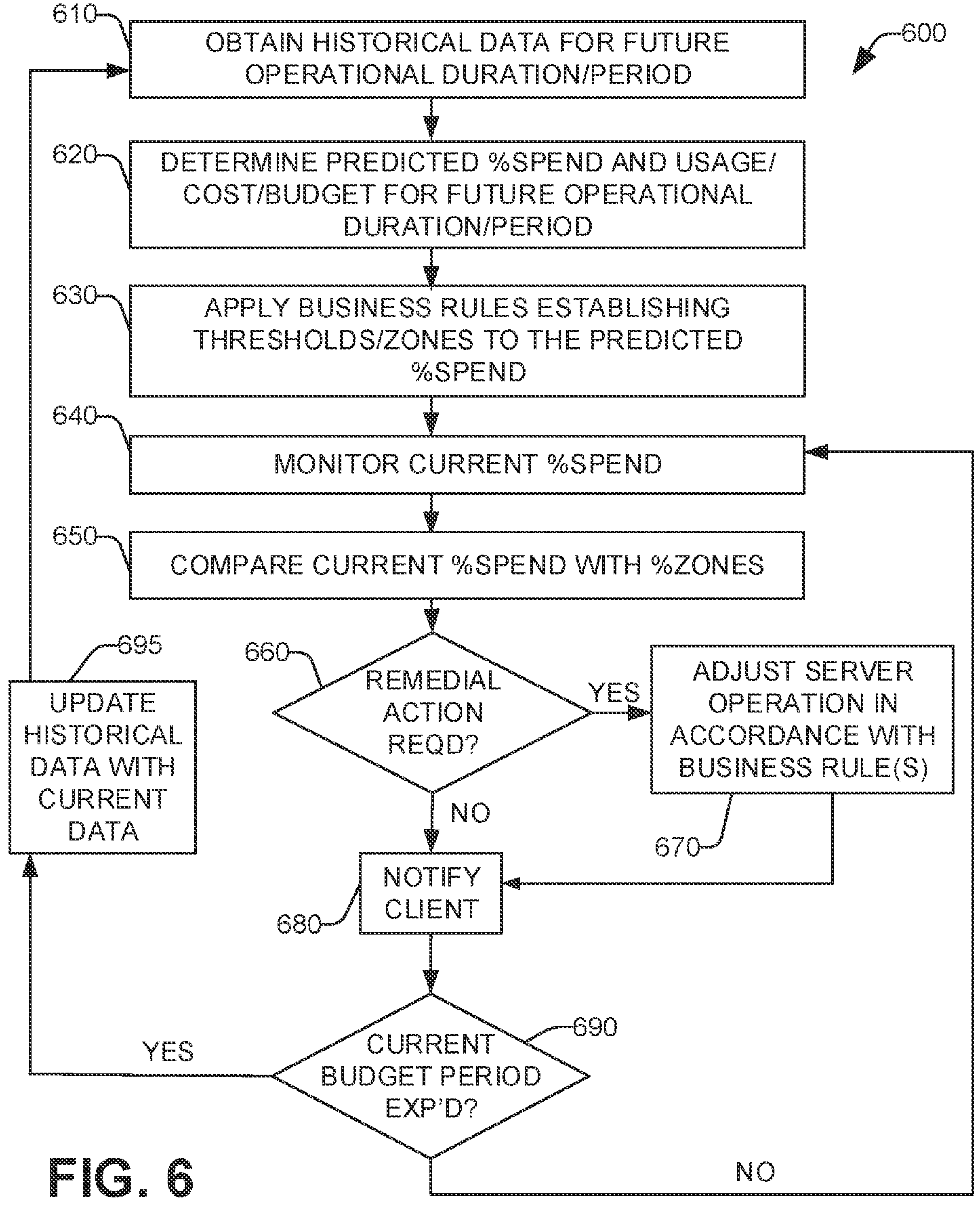
FIG. 6 illustrates a computer-implemented process for monitoring and controlling operation of a cloud server, according to one or more embodiments.

FIG. 6 presents process 600 illustrating a computer-implemented process for monitoring and controlling operation of a cloud server, according to one or more embodiments.

At 610, historical data (e.g., historical data 190) can be obtained by a budget control component (e.g., BCC 130), where historical data comprises measurements, knowledge, etc., accrued for prior durations of time/periods of time (e.g., durations 111A-n, periods 112A-n) for which operation of respective cloud servers (e.g., cloud servers 105A-n) and included data servers (e.g., data servers 106A-n) has been monitored.

At 620, the historical data can be analyzed by a template component (e.g., by template component 510) from which a budget prediction template (e.g., BPT 170) can be generated by the template component. As previously described, the template can comprise of a trendline of predicted usage, cost, and budget (e.g., usage 115A-n, cost 116A-n, and budget 110A-n) generated from prior usage for the period of interest.

At 630, one or more business rules (e.g., business rules 133A-n) can be applied by the template component to the template to establish respective usage thresholds/usage zones (e.g., thresholds 211A-n and zones 210A-n), from which the future % Spend (e.g., % Spend 114A-n) can be compared with.

At 640, the current usage, with associated cost, for the respective workloads can be monitored by a monitor component (e.g., by monitor component 520).

At 650, the current usage can be compared by the monitor component with the budget established in the template, e.g., current usage is converted to % Spend of anticipated budget and subsequently identified with respect to the % Spend thresholds and % Spend zones (e.g., zones 210A-n).

At 660, based on the determined zone(s) in which the current % Spend corresponds to, in conjunction with the respective business rule assigned to that respective zone, a determination can be made by the monitor component regarding an action to implement. As previously described, the combination of business rules and actions (e.g., actions 135A-n) can have any applicable response, e.g., maintain current operation of the cloud data server(s)/do not adjust operation of one or more data servers located in a cloud data server, throttle UP/DOWN a number of available cloud data servers/data servers, temporarily/permanently terminate servicing workloads at a cloud data server(s)/data server(s), limit/enable access based on user role, and suchlike. As mentioned, any suitable business rule and/or action can be configured to respond to a determination of which zone in the template the current usage resides. In response to a determination by the monitor component that, based on the current % Spend, YES a remedial action is required regarding operation of one or more cloud data server(s)/data server(s), process 600 can advance to step 670, whereupon the required action can be implemented by a control component (e.g., control component 530) at the cloud data server(s)/data server(s), as defined in the corresponding business rule(s). Process 600 can further advance to step 680, whereupon a notification (e.g., notification 145A-n) can be generated and transmitted by a notification component (e.g., notification component 140) to a client (e.g., client 102A) utilizing the BCS system. The notification can provide details regarding any of prior/current/future usage, cost(s), % Spend, predicted budget, action(s) undertaken, current operational status of cloud data server(s)/data server(s), and suchlike.

Process 600 can advance to step 690, wherein the monitor component can be configured to determine whether the current billing cycle (e.g., duration 111C) has come to an end, or whether further monitoring and control is to be performed for the current billing cycle, e.g., for the next period in duration (e.g., next period 112A-n in duration 111C).

At 690, in response to a determination by the monitor component that NO, the current billing cycle has not come to an end, process 600 can return to step 640, whereupon monitoring and control can be performed for the next period in the duration of the budget control, with subsequent activity based thereon as previously described.

At 690, in response to a determination that YES, the end of the current billing cycle has been reached, process 600 can advance to step 695, whereupon the historical data (e.g., historical data 190) can be updated by a data historian (e.g., data historian 540) with the respective knowledge accrued during the current billing cycle, e.g., for future usage and/or budget prediction. Process 600 can subsequently advance to step 610 for usage and % Spend monitoring, and budget control to be performed for the next billing cycle, as previously described.

Figure 7:
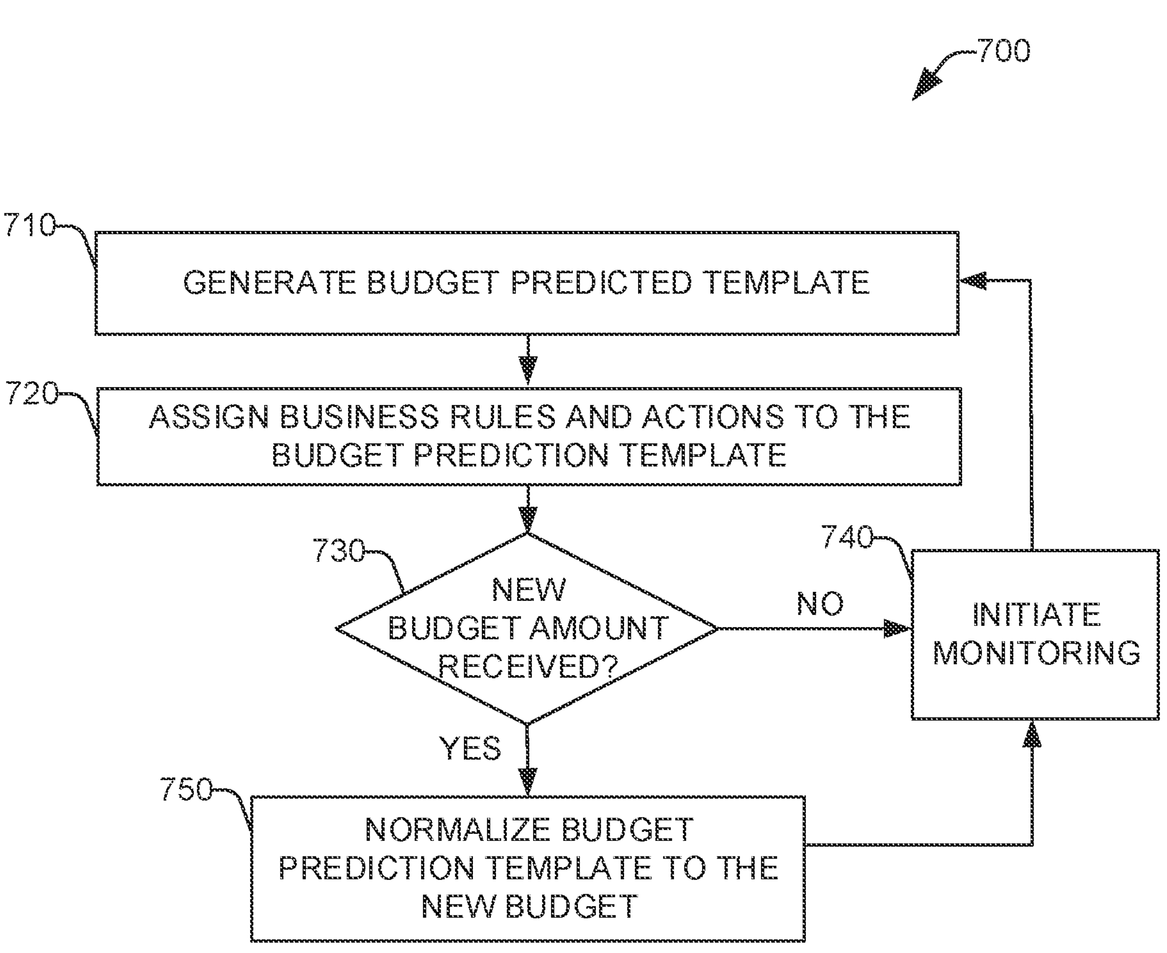
FIG. 7 illustrates a computer-implemented process for adjusting operation of a cloud server based on an initial and subsequent operational budget, according to one or more embodiments.

FIG. 7 presents process 700 illustrating a computer-implemented process for adjusting operation of a cloud server based on an initial and subsequent operational budget, according to one or more embodiments.

At 710, a budget prediction template (e.g., BPT 170) can be generated by a template component (e.g., by template component 510), e.g., based on historical data 190A-n and a first/initial budget 110A. The template can be configured by the template component with respective thresholds and zones (e.g., zones 210A-n and thresholds 211A-n).

At 720, as previously described, respective business rules (e.g., business rules 133A-n) and associated actions (e.g., actions 135A-n) can be applied by the template component to the budget prediction template.

At 730, prior to implementing the budget prediction template, a determination can be made by the template component regarding whether a new budget has been received, e.g., in a requirement (e.g., requirement 515A-n) received from a client (e.g., client 102). In response to a determination by the template component that NO new budget has been received, process 700 can advance to step 740, whereupon monitoring and control of the cloud server and workloads (e.g., workloads 108A-n) can be initiated by a monitor component (e.g., by monitor component 520) based on the budget prediction template. Process 700 can continue until the monitoring duration/period (e.g., duration 111A-n, period 112A-n) has expired, with process 700 returning to step 710.

At 730, in response to a determination by the template component that YES a new budget 110B has been received, process 700 can advance to step 750. At 750, the template component can normalize the budget prediction template in accordance with the newly received budget, wherein normalizing can comprising adjusting the budget prediction template (e.g., the x-axis of FIGS. 2A and 2B) to match the total of the newly received budget. For example, the total budget point (e.g., TBP 171) can be adjusted to match the amount of the newly received budget. Process 700 can advance to 740 whereupon monitoring and control of the cloud server and workloads (e.g., workloads 108A-n) can be initiated by the monitor component based on the normalized budget prediction template. Process 700 can continue until the monitoring period has expired, with process 700 returning to step 710, as previously described.

FIG. 8 presents process 800 illustrating a computer-implemented process for combining monitoring and control of two or more cloud servers by a single system, according to one or more embodiments.

At 810, as previously mentioned, two or more cloud data servers (e.g., cloud data servers 105A-n) can be monitored by a single budget prediction system (e.g., BCS 120), a first cloud data server (e.g., cloud data server 105A) operates with a first software application/interface (e.g., at controller 107A) and the second cloud data server (e.g., cloud data server 105B) operates with a second software application/interface (e.g., at controller 107B), wherein the first software application and second software application are disparate.

At 820, the respective controllers (e.g., controllers 107A-n) are interfaced with a control component (e.g., control component 530). The control component can be configured with a common interface (e.g., HMI 186/screen 187) while communicating with the respective controllers via respective control software required for each unique instance of controllers.

At 830, operation of the respective cloud data servers during servicing various workloads (e.g., workloads 108A-n) can be monitored (e.g., by monitor component 520).

At 840, the control component can be further configured to control operation of the respective controllers at the cloud data servers in response to one or more actions (e.g., actions 135A-n) received from either of the template component (e.g., template component 510) and/or an operation monitor component (e.g., monitor component 520). The control component can be configured to generate and transmit actions to the respective cloud data servers and further receive notification(s)/feedback from the cloud data servers regarding an operating condition of the respective cloud data server.

FIG. 9 presents process 900 illustrating a computer-implemented process for generating a budget prediction template, according to one or more embodiments.

At 910, a duration (e.g., duration 111A) and respective periods (e.g., periods 112A-n) can be identified for a future duration of monitoring operation of one or more cloud data servers (e.g., cloud data servers 105A-n) while servicing a workload (e.g., workload 108A). Duration can comprise an upcoming day, week, month, etc., of monitoring.

At 920, historical data (e.g., historical data 190) can be obtained and analyzed by a template component (e.g., by template component 510), wherein the historical data pertains to the future duration of monitoring, e.g., historical data is for days/weeks/months/etc., prior to the future duration, historical data is for a comparable period of time in a prior year (e.g., a holiday period such as thanksgiving). In an embodiment, a client or user (e.g., client 102A or user 118A) can identify the future duration via an interface (e.g., HMI 186) and the template component can be configured to identify the comparable durations/periods in the historical data. For example, per FIG. 4A, three prior groups/sets of historical data prior budget curves 410A-C are identified.

At 930, the template component can be configured to generate a budget prediction template (e.g., BPT 170) from the historical data. For example, averaging the three prior sets of historical data to obtain the predicted usage/budget threshold (e.g., threshold 211T).

At 940, the various zones (e.g., zones 210A-n) and associated actions (e.g., actions 135A-n) can be applied to the budget prediction template by the template component and adjusted as needed (e.g., by client 102/user 118).

At 950, monitoring (e.g., by monitor component 520) of servicing the workloads at the cloud data servers can be performed, as previously described.

Figure 10:
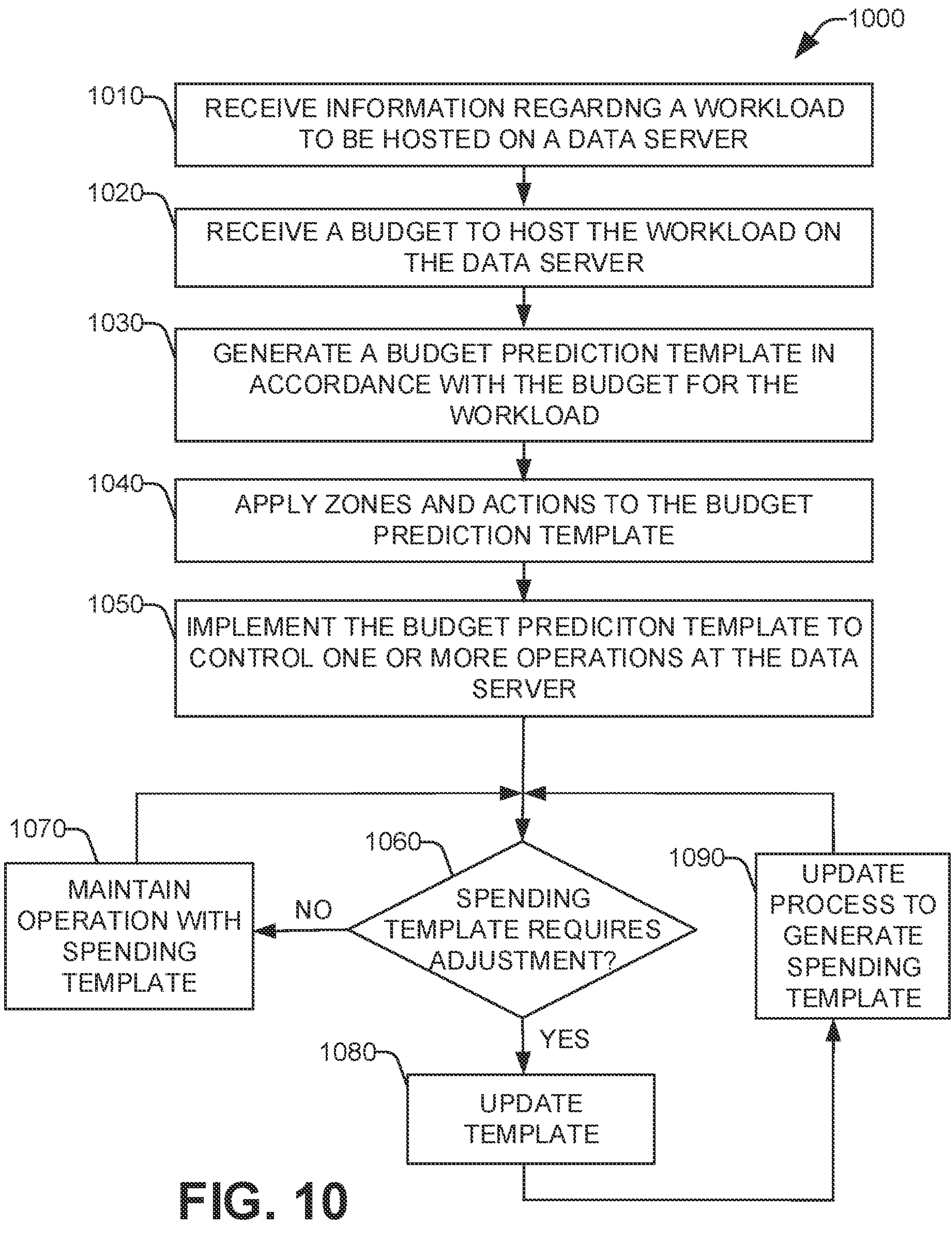
FIG. 10 illustrates a computer-implemented process for generating a budget prediction template, according to one or more embodiments.

FIG. 10 presents process 1000 illustrating a computer-implemented process for generating a budget prediction template, according to one or more embodiments.

At 1010, information can be received at a template component (e.g., template component 510) configured to generate a budget prediction template (e.g., BPT 170A-n), wherein the information can relate to operational information for servicing a workload (e.g., workload 108A-n) on a data server (e.g., data server 106A-n in a cloud server 105A-n).

At 1020, a budget (e.g., budget 110A-n) can be received at the template component, wherein the budget is anticipated/expected cost to host the workload at the data server for a particular duration (e.g., duration 111A-n) and/or series of consecutive periods (e.g., periods 112A-n) in the duration.

At 1030, the template component can be configured to generate a budget prediction template based on, for example, prior budget templates, usages, costs, durations, periods, etc., (e.g., prior usages 115A-n, prior costs 116A-n, prior rates 117A-n, and suchlike), utilized for previously implemented budget prediction templates. In an embodiment, template component 510 can utilize a process component (e.g., process component 560) and applicable AI and ML processes (e.g., processes 566A-n) to identify prior budget prediction templates similar/corresponding to the current workload and available budget. For example, the AI and ML processes can be utilized to prior budget templates based on usage, comparable workloads, durations, etc.

At 1040, as previously described, the template component can be configured to apply respective business rules, zones, and actions (e.g., business rules 133A-n, zones 210A-n, actions 135A-n) to the budget prediction template.

At 1050, the budget prediction template can be implemented by a control component (e.g., control component 530) to control operation and associated costs (e.g., costs 116A-n) at the data server hosting the workload.

At 1060, a determination can be made by the control component regarding whether the budget prediction template is effectively/efficiently controlling operation of the data server, e.g., is the current usage within an acceptable cost (e.g., less than 80% of budget)? Is the current usage regularly/consistently exceeding the predicted budget and requires extensive intervention/adjustment by an operator (e.g., client 102, user 118) overseeing use of the data server?, and suchlike. At 1060, in response to a determination that NO, the template does not require adjustment, process 1000 can advance to step 1070 whereupon monitoring/control of servicing of the workloads can be maintained with the budget prediction template. Process 1000 can return to step 1060 for further review of the budget prediction template until the current duration of monitoring expires.

At 1060, in response to a determination by the control component that YES, the budget prediction template requires adjustment, process 1000 can advance to step 1080, whereupon the budget prediction template can be updated based on intervention by the operator. The control component, the template component, and/or the process component can be configured to monitor one or more adjustments applied by the operator to the current budget prediction template and, at step 1090 utilize the one or more adjustments to re-train the AI and ML processes to enable improved subsequent generation of budget prediction templates. Process 1000 can return to step 1060 for further review of the budget prediction template until the current duration of monitoring expires.

Per the various embodiments presented herein, various components included in the BCS 120, e.g., BCC 130, template component 510, monitor component 520, control component 530, notification component 140, data historian 540, and suchlike, can include AI and ML reasoning techniques and technologies (e.g., processes 566A-n and process component 560) that employ probabilistic and/or statistical-based analysis to prognose or infer an action that a client/user desires to be automatically performed. The various embodiments presented herein can utilize various machine learning-based schemes for carrying out various aspects thereof. For example, a process (e.g., by template component 510) for generating a BPT 170A-n including various zones 210A-n and actions 135A-n, and further utilizing the BPT 170A-n to facilitate monitoring and control (e.g., by monitor component 520 and control component 530) costs 116A-n incurred by servicing workloads 108A-n on one or more cloud servers 105A-n, and suchlike, as previously mentioned herein, can be facilitated via an automatic classifier system and process.

A classifier is a function that maps an input attribute vector, x=(x1, x2, x3, x4, xn), to a class label class (x). The classifier can also output a confidence that the input belongs to a class, that is, f(x)=confidence(class(x)). Such classification can employ a probabilistic and/or statistical-based analysis (e.g., factoring into the analysis utilities and costs) to prognose or infer an action that a user desires to be automatically performed (e.g., generation of a BPT170A-n, controlling costs 116A-n, and operations related thereto).

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein is inclusive of statistical regression that is utilized to develop models of priority.

As will be readily appreciated from the subject specification, the various embodiments can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to predetermined criteria, applicability of a predicted budget 110A-n and associated actions 135A-n to control costs 116A-n, for example.

As described supra, inferences can be made, and operations performed, based on numerous pieces of information. For example, respective prior budgets 110A-n, durations 111A-n, periods 112A-n, business rules 133A-n, actions 135A-n, and suchlike, are applicable to monitoring future usage 115A-n at a cloud server 105A-n, e.g., based on the prior budgets 110A-n, etc., being similar to the future usage 115A-n, and suchlike, to enable BCS 120 to prevent cost overruns at cloud servers 105A-n.

Example Environments of Use

Figure 11:
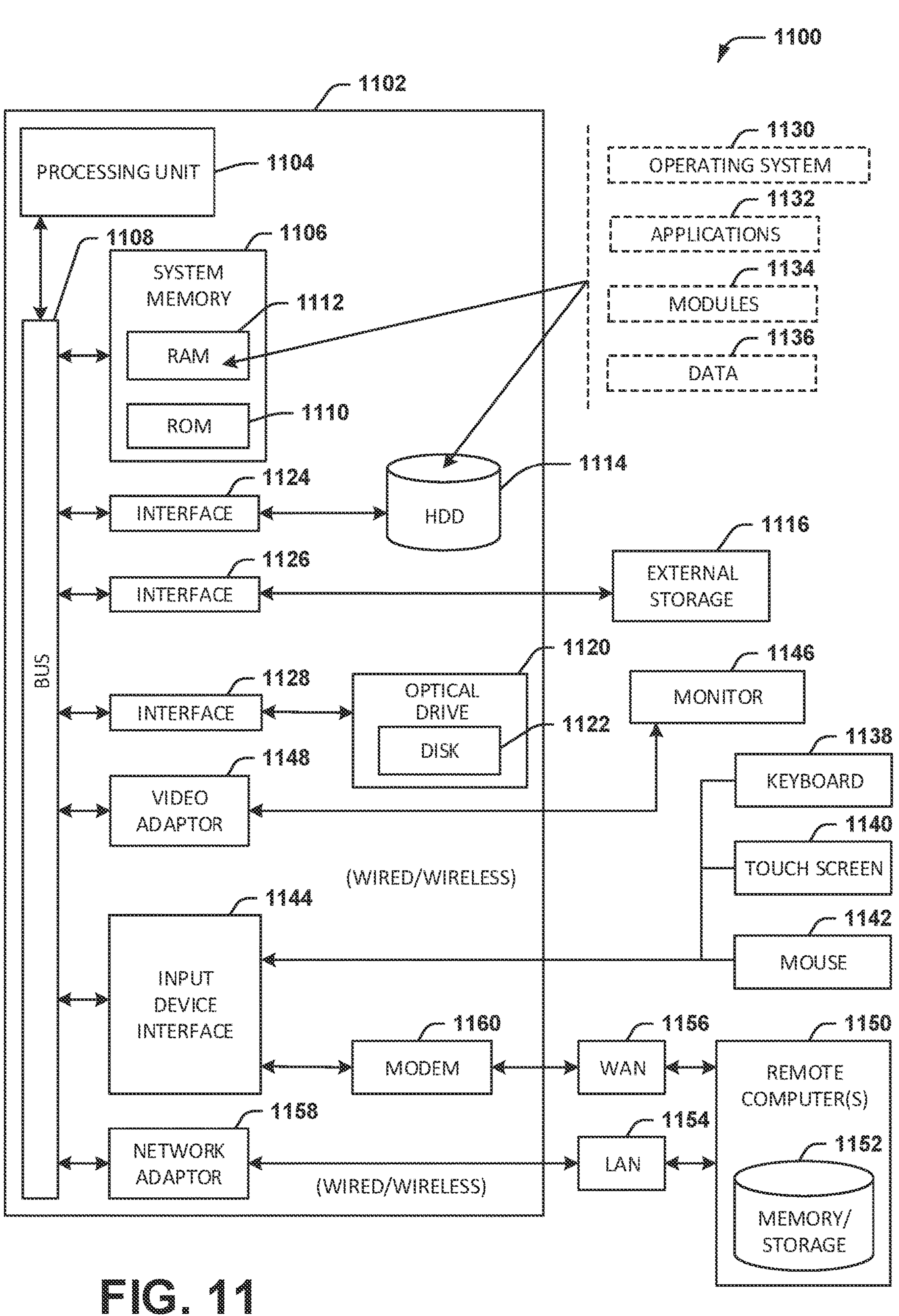
FIG. 11 depicts an example schematic block diagram of a computing environment with which the disclosed subject matter can interact/be implemented at least in part, in accordance with various aspects and implementations of the subject disclosure.
Figure 12:
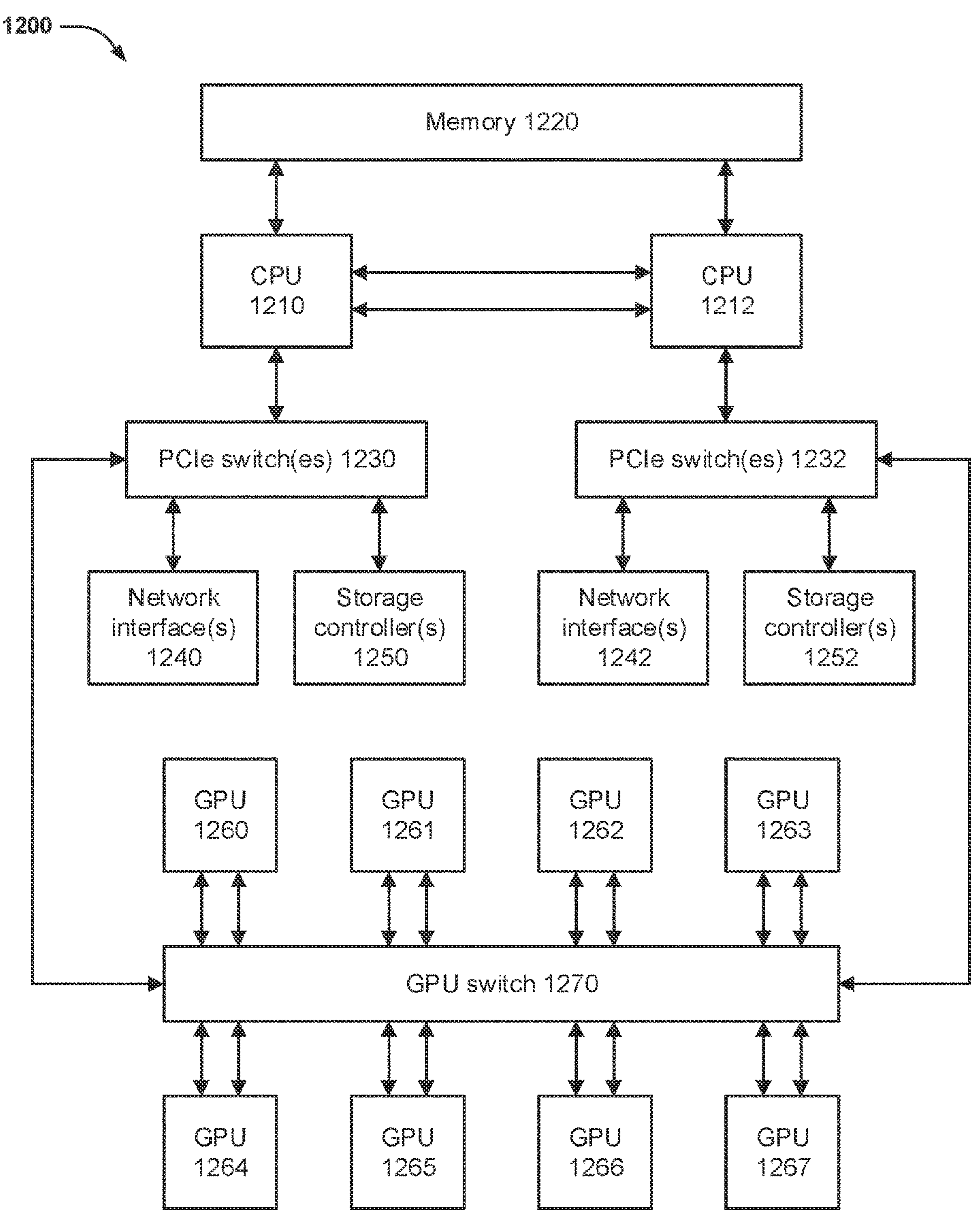
FIG. 12 is a diagram of an example computing environment in which various implementations described herein can function.
Figure 13:
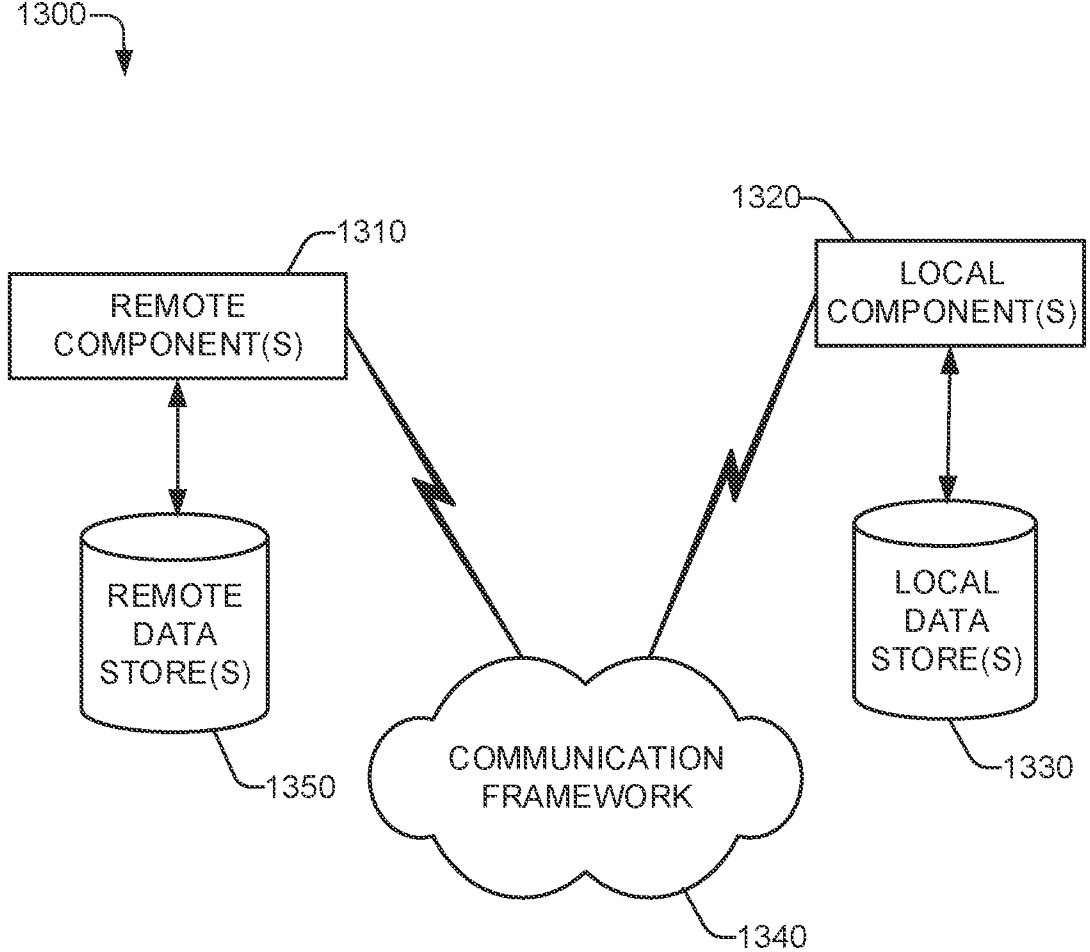
FIG. 13 is a block diagram representing an example computing environment into which aspects of the subject matter described herein may be incorporated.

Turning next to FIGS. 11-13, a detailed description is provided of additional context for the one or more embodiments described herein with FIGS. 1-10.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors and may include a cache memory. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1084 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can comprise a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1094 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Turning next to FIG. 12, an example server architecture 1200 that can be utilized in connection with one or more implementations described above is illustrated. The server architecture 1200 shown in FIG. 12 can be associated with a server device, such as a rackmount server, a blade server, or the like, which can be physically and/or communicatively coupled to a chassis (not shown in FIG. 12) and/or other physical devices for use in a computing environment such as a computing cloud, a data center, etc.

The server architecture 1200 shown in FIG. 12, referred to below as simply a server for brevity, can include one or more central processing units (CPUs), here two CPUs 1210, 1212. In a typical implementation of the server 1200, the CPUs 1210, 1212 are high-performance server processors that provide scalability and a high number of processing cores per CPU, e.g., up to 56 cores per processor for current implementations. The CPUs 1210, 1212 of the server 1200 are communicatively coupled to each other by, e.g., processor interconnect links, such as QuickPath Interconnect (QPI) or Ultra Path Interconnect (UPI) links developed by the Intel® Corporation. Alternatively, other means for coupling the CPUs 1210, 1212, such as a front side bus (FSB) or the like, could also be used. While two interconnect links are shown in FIG. 12 coupling CPUs 1210 and 1212, it is noted that more, or fewer, links could also be used.

The CPUs 1210, 1212 shown in FIG. 12 are additionally coupled to a system memory 1220, which can include one or more Dual In-line Memory Modules (DIMMs) and/or other devices. While the system memory 1220 is illustrated as a single block in FIG. 12 for simplicity, it is noted that the system memory 1220 is typically implemented via a group of memory modules. For example, the CPUs 1210, 1212 can collectively be associated with a number of DIMM slots (e.g., 16 slots, 32 slots, etc.), and DIMMs making up the system memory 1220 can be placed into these slots to facilitate connection to the CPUs 1210, 1212. Depending on implementation, the memory modules making up the system memory 1220 can be communicatively coupled to one, or more, of the CPUs 1210, 1212.

As further shown in FIG. 12, Peripheral Component Interconnect Express (PCIe) switches 1230, 1232 can connect the CPUs 1210, 1212 to respective other components of the server 1200, such as network interfaces 1240, 1242, storage controllers 1250, 1252, or the like. The network interfaces 1240, 1242 can include network interface cards (NICs) and/or other suitable components to facilitate connecting the server 1200 to other servers or suitable computing devices, e.g., in a clustered computing environment. The storage controllers 1250, 1252 can include nonvolatile memory express (NVMe) controllers and/or other interface devices that facilitate the coupling of storage devices, such as non-volatile RAM (NVRAM) devices, SSDs, or the like, to the server 1200.

While FIG. 12 shows a configuration in which each CPU 1210, 1212 is connected to one PCIe switch 1230, 1232, other configurations could be used. For instance, a one-to-many or many-to-one connection scheme could be used between the CPUs 1210, 1212 and the PCIe switches 1230, 1232. Similarly, the network interfaces 1240, 1242 and storage controllers 1250, 1252 could be connected to the PCIe switches 1230, 1232 in a one-to-many or many-to-one configuration in addition to, or in place of, the one-to-one connection scheme shown in FIG. 12.

The server 1200 shown in FIG. 12 further includes a group of co-processors, such as graphics processing units (GPUs), intelligence processing units (IPUs) for artificial intelligence workloads, etc.; in FIG. 12, there are eight GPUs 1260-1267, which provide further processing capability to server 1200. While eight GPUs 1260-1267 are shown in FIG. 12, more, or fewer, GPUs could also be used. The GPUs 1260-1267 of server 1200 are preferably specialized GPUs that are designed for high-performance computing applications, such as H100 and/or A100 GPUs developed by the NVIDIA® Corporation, although other GPUs could also be used. Each of the GPUs 1260-1267 of the server are communicatively coupled to each other via suitable communications links, such as NVLink® interconnects developed by the NVIDIA® Corporation and/or other suitable connections. In the example shown by FIG. 12, a GPU switch 1270 facilitates full interconnection between the GPUs 1260-1267. In other implementations, the GPUs 1260-1267 could instead be interconnected directly without the use of a switch or other means.

As additionally shown by FIG. 12, the GPU switch 1270 is communicatively coupled to the PCIe switches 1230, 1232 to enable communication between the GPUs 1260-1267 and other components of the server 1200. Other connection schemes could also be used. For instance, one or more of the GPUs 1260-1267 could connect to the PCIe switches 1230, 1232 and/or the CPUs 1210, 1212 directly, e.g., in an implementation in which a GPU switch 1270 is not present.

Referring now to details of one or more elements illustrated in FIG. 13, an illustrative cloud computing environment 1300 is depicted. FIG. 13 is a schematic block diagram of a computing environment 1300 with which the disclosed subject matter can interact. The system 1300 comprises one or more remote component(s) 1310. The remote component(s) 1310 can be hardware and/or software (e.g., threads, processes, computing devices). In some embodiments, remote component(s) 1310 can be a distributed computer system, connected to a local automatic scaling component and/or programs that use the resources of a distributed computer system, via communication framework 1340. Communication framework 1340 can comprise wired network devices, wireless network devices, mobile devices, wearable devices, radio access network devices, gateway devices, femtocell devices, servers, etc.

The system 1300 also comprises one or more local component(s) 1320. The local component(s) 1320 can be hardware and/or software (e.g., threads, processes, computing devices). In some embodiments, local component(s) 1320 can comprise an automatic scaling component and/or programs that communicate/use the remote resources 1310 and 1320, etc., connected to a remotely located distributed computing system via communication framework 1340.

One possible communication between a remote component(s) 1310 and a local component(s) 1320 can be in the form of a data packet adapted to be transmitted between two or more computer processes. Another possible communication between a remote component(s) 1310 and a local component(s) 1320 can be in the form of circuit-switched data adapted to be transmitted between two or more computer processes in radio time slots. The system 1300 comprises a communication framework 1340 that can be employed to facilitate communications between the remote component(s) 1310 and the local component(s) 1320, and can comprise an air interface, e.g., Uu interface of a UMTS network, via a long-term evolution (LTE) network, etc. Remote component(s) 1310 can be operably connected to one or more remote data store(s) 1350, such as a hard drive, solid state drive, SIM card, device memory, etc., that can be employed to store information on the remote component(s) 1310 side of communication framework 1340. Similarly, local component(s) 1320 can be operably connected to one or more local data store(s) 1330, that can be employed to store information on the local component(s) 1320 side of communication framework 1340.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "consumer," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G or other next generation networks, the disclosed aspects are not limited to a 5G implementation, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:

at least one processor, and a memory coupled to the at least one processor and having instructions stored thereon, wherein, in response to execution of the instructions using the at least one processor, the instructions facilitate performance of operations, comprising:

configuring a template to be usable to control operation of a data server, wherein the template comprises action data representative of actions associated with respective percentage spends of a predicted operating budget for the data server, wherein the template comprises:

an x-axis representing cost, a y-axis representing duration of time, and an upper threshold indicating a defined budget to host a workload on the data server, and a group of zones defined according to the upper threshold, wherein:

a first zone in the group of zones defines a first cost to host the workload and a first action being defined for the first zone, wherein the first zone is located at a first position on the x-axis and a first position on the y-axis defining the first cost for a first duration of time, and a second zone in the group of zones defines a second cost to host the workload and a second action being defined for the second zone, wherein the second zone is located at a second position on the x-axis and at the first position on the y-axis defining the second cost for the first duration of time, wherein the second cost is different from the first cost, and wherein the first action and the second action comprise at least one of reducing available resources enabled via the data server or limiting user access to a collection of data servers comprising the data server;

receiving digital data indicating a current operational cost to host the workload at the data server;

comparing the current operational cost to host the workload with the first cost and the second cost; and in response to determining a first operational usage at the data server correlates to the first cost, implementing the first action to control cost of hosting the workload on the data server.

2. The system of claim 1, wherein the data server is located in a cloud-based data server system.

3. The system of claim 1, wherein the operations further comprising:

receiving a workload to be hosted by the data server;

determining a budget to service the workload over a duration of time on the data server, resulting in a determined budget; and generating the predicted operating budget from the determined budget to service the workload over the duration of time on the data server.

4. The system of claim 1, wherein user access is limited based on user role.

5. The system of claim 1, wherein the current operational cost is a first operational cost, and the operations further comprising:

determining a second operational usage at the data server correlates to a second operational cost;

determining that the second operational cost correlates to the second cost; and adjusting operation of the data server from the first action to second action associated with the second cost.

6. The system of claim 5, wherein the second action comprises at least one of increasing available resources enabled via the data server or increasing a variety of user roles able to access the data server.

7. The system of claim 1, the operations further comprising:

generating the predicted operating budget for the data server based on at least one prior workload previously completed via the data server.

8. The system of claim 7, the operations further comprising:

receiving a defined operating budget for the data server, wherein the defined operating budget is disparate to the predicted operating budget for the data server;

normalizing the predicted operating budget by applying the defined operating budget to the predicted operating budget, to generate a normalized operating budget; and reapplying the actions based on the normalized operating budget.

9. The system of claim 1, wherein the operation of the data server is controlled for a duration of time, the predicted operating budget for a first period in the duration of time is less than or equal to the predicted operating budget for a second period in the duration of time, wherein the first period in the duration of time is prior to the second period in the duration of time.

10. The system of claim 1, wherein the data server is a first data server located in a first cloud data server, operating with a first control application, the system further comprising a second data server located in a second cloud data server operating with a second control application, and the operations further comprising:

configuring a common interface to communicate with the first control application and the second control application, wherein the first control application and the second control application utilize disparate control software protocols.

11. A computer-implemented method, comprising:

monitoring, by a device comprising at least one processor, a current cost to host a workload currently being implemented via a data server;

comparing, by the device, the current cost with a budget prediction template, the budget prediction template comprising:

an x-axis representing cost, a y-axis representing duration of time, and an upper threshold indicating a defined budget to host a workload on a data server, and a group of zones defined according to the upper threshold, wherein:

a first zone in the group of zones defines a first cost to host the workload and a first action being defined for the first zone, wherein the first zone is located at a first position on the x-axis and a first position on the y-axis defining the first cost for a first duration of time, and a second zone in the group of zones defines a second cost to host the workload and a second action being defined for the second zone, wherein the second zone is located at a second position on the x-axis and at the first position on the y-axis, wherein the second cost is different than the first cost, and wherein the first action and the second action respectively comprise at least one of reducing available resources enabled via the data server or limiting user access to a collection of data servers comprising the data server; and in response to determining the current cost matches the first cost, implementing the first action to control cost of hosting the workload on the data server.

12. The computer-implemented method of claim 11, further comprising:

in response to determining the current cost matches the second cost, increasing, by the device, resources available at the data server that are usable to host the workload, wherein the second cost is determined subsequent to the first cost.

13. The computer-implemented method of claim 12, wherein the first cost is a first percentage of the defined budget to host the workload on the data server as represented by the upper threshold, and the second cost is a second percentage of the defined budget to host the workload on the data server as represented by the upper threshold.

14. The computer-implemented method of claim 11, further comprising:

analyzing, by the device, historical data to determine the assigned budget, wherein the historical data comprises a cost to implement the workload on the data server previously.

15. The computer-implemented method of claim 11, further comprising:

receiving, by the device, an instruction comprising a percentage setting applicable to the assigned budget; and configuring, by the device, the defined percentage of the assigned budget according to the percentage setting.

16. A computer program product stored on a non-transitory computer-readable medium and comprising machine-executable instructions, wherein, in response to being executed, the machine-executable instructions cause computing equipment comprising at least one processor to perform operations, comprising:

generating a budget prediction template, the budget prediction template comprising:

an x-axis representing cost, a y-axis representing duration of time, and an upper threshold indicating a defined budget to host a workload on a data server, and a group of zones defined according to the upper threshold, wherein:

a first zone in the group of zones defines a first cost to host the workload and a first action being defined for the first zone, wherein the first zone is located at a first position on the x-axis and a first position on the y-axis defining a first cost for a first duration of time, and a second zone in the group of zones defines a second cost to host the workload and a second action being defined for the second zone, wherein the second zone is located at a second position on the x-axis and at the first position on the y-axis, wherein the second cost is different than the first cost, and wherein the first action and the second action comprise at least one of reducing available resources enabled via the data server or limiting user access to a collection of data servers comprising the data server;

receiving digital data indicating a current cost to host the workload via the data server;

analyzing the current cost to host the workload via the data server relative to the first cost and the second cost; and in response to determining, based on the analyzing, that the current cost matches the first cost, implementing the first action to control cost of hosting the workload on the data server, or in response to determining, based on the analyzing, that the current cost matches the second cost, implementing the second action to control the cost of hosting the workload on the data server.

17. The computer program product according to claim 16, wherein the defined budget is based on a past budget previously available to host the workload on the data server.

18. The computer program product according to claim 16, wherein the budget prediction template comprises duration data corresponding to a duration of time for which the workload is to be hosted via the data server, wherein the duration comprises a consecutive sequence of time periods during which implementation of the workload on the data server is to be measured, and wherein the upper threshold corresponds to a limit on budget available to host the workload for each period in the sequence of time periods.

19. The computer-implemented method of claim 11, wherein the data server is located in a cloud-based data server system.

20. The computer program product according to claim 16, wherein the data server is located in a cloud-based data server system.

* * * * *